United States Patent [19]
Sakata et al.

[11] Patent Number: 5,561,285
[45] Date of Patent: Oct. 1, 1996

[54] IMAGE FORMING APPARATUS AND LIGHT QUANTITY CONTROL DEVICE HAVING A LIGHT EMISSION MODE CONTROL MEANS

[75] Inventors: Shirou Sakata, Tokyo; Koichi Ōtaka, Kawasaki; Masako Takahashi, Yokohama, all of Japan

[73] Assignee: Canon Kabushiki Kaisha, Tokyo, Japan

[21] Appl. No.: 419,743

[22] Filed: Apr. 10, 1995

Related U.S. Application Data

[63] Continuation of Ser. No. 305,752, Sep. 14, 1994, abandoned, which is a continuation of Ser. No. 103,036, Jul. 28, 1993, abandoned.

[30] Foreign Application Priority Data

| Jul. 29, 1992 | [JP] | Japan | 4-202526 |
| Jul. 29, 1992 | [JP] | Japan | 4-202527 |
| Jul. 29, 1992 | [JP] | Japan | 4-202542 |

[51] Int. Cl.⁶ ........................................ G01J 1/32
[52] U.S. Cl. .............................. 250/205; 358/475
[58] Field of Search .................... 250/205, 234, 250/235, 236, 214 P, 216; 358/475, 481

[56] References Cited

U.S. PATENT DOCUMENTS

| 4,443,695 | 4/1984 | Kitamura | 250/214 AG |
| 4,463,364 | 7/1984 | Tamura | 346/160 |
| 4,727,382 | 2/1988 | Negishi et al. | 346/108 |
| 4,879,459 | 11/1989 | Negishi | 250/205 |
| 4,912,714 | 3/1990 | Hatanaka et al. | 372/31 |
| 4,945,222 | 7/1990 | Sakai et al. | 250/205 |
| 5,130,524 | 7/1992 | Egawa et al. | 250/205 |
| 5,229,870 | 7/1993 | Inoguchi | 358/475 |
| 5,285,058 | 2/1994 | Goodwin | 250/205 |
| 5,369,272 | 11/1994 | Eguchi | 250/205 |

FOREIGN PATENT DOCUMENTS

| 358171 | 3/1990 | European Pat. Off. . |

*Primary Examiner*—Que T. Le
*Attorney, Agent, or Firm*—Fitzpatrick, Cella, Harper & Scinto

[57] ABSTRACT

A semiconductor laser is caused to emit laser light continuously on a plurality of scanning lines prior to image formation in a laser printer. An electric current to be applied is controlled so that the detected light quantity from the semiconductor laser becomes equal to the desired light quantity. The light quantity detected during pulsed emission with the applied current is used as the desired light quantity for APC which is performed at a space between sheets when a non-image area is scanned. Alternatively, laser light is emitted on a plurality of lines before the start of printing when printing of multiple pages is to be performed in a laser beam printer, to perform light quantity control. Then, laser light is emitted during scanning of a nonimage area between pages, to perform light quantity control. When light quantity control is performed between sheets, a value obtained by correcting an error between the quantities of light in both types of light quantity control is set as the desired light quantity. Alternatively, laser light is emitted continuously on a plurality of scanning lines prior to image formation to perform light quantity control. Then, laser light is emitted only when laser is scanning a non-image area to perform light quantity control, thereby setting a current volume to be applied to the semiconductor laser during image formation.

8 Claims, 32 Drawing Sheets

IMAGE FORMING APPARATUS AND LIGHT QUANTITY CONTROL DEVICE HAVING A LIGHT EMISSION MODE CONTROL MEANS

This application is a continuation of application Ser. No. 08/305,752 filed Sep. 14, 1994, now abandoned, which was a continuation of application Ser. No. 08/103,036 filed Jul. 28, 1993, now abandoned.

BACKGROUND OF THE INVENTION

1. Field of the Invention

The present invention relates to an image forming apparatus using a semiconductor laser, such as a laser beam printer, and a light quantity control device for use in such an image forming apparatus.

2. Description of the Related Art

The relation between an electric current supplied to a laser diode and a light output differs according to the laser diode, and also varies depending on the heat evolution of the laser diode itself. Thus, a mere constant current control of an open loop type cannot result in laser light emission with constant light quantity. It is necessary to monitor the output power of light and control it so as to obtain the desired output power level. This type of control is called automatic power control (APC).

FIG. 1 shows a laser control circuit which performs the APC. This laser control circuit is composed of a current stabilizer circuit 1, a switching circuit 2, an amplifier 3, and a control device 10. The current stabilizer circuit 1 is a voltage-current converter which flows an electric current $I_1$ corresponding to a light quantity signal 4 from the control device (CPU) 10. A circuit for switching it with a laser lighting signal 5 is the switching circuit 2. Responsive to this action of the switching circuit 2, a laser diode 6 emits light. The quantity of this light emission is taken out by a photodiode 7 as a current volume, and converted by a resistor 8 into a voltage signal. The quantity of light emission taken out as a voltage volume is amplified by the amplifier 3 to become an emission volume signal 9. The control device 10 raises the level of the light quantity signal 4 while monitoring the emission volume signal 9.

A flow chart of FIG. 2 illustrates this action of the APC. This control is performed in the following manner: Before recording of one page is initiated, e.g. during preliminary rotation, a laser forced lighting signal is activated, and then the emission volume signal 9 is monitored. If the quantity of light emission is lower than the desired value, the level of the light quantity signal is raised by one step. If it is higher than the desired value, by contrast, the level of the light quantity signal is lowered by one step. If the quantity of light emission is identical with the desired value, the APC action is completed. During this action, a laser beam scans portions corresponding to the arrows of FIGS. 3 and 4.

The APC may be performed in several ways: It is performed first of all before image formation as shown in FIG. 3 (initial APC). In case a plurality of sheets are recorded continuously, it is also performed at a portion between a preceding sheet 11 and a succeeding sheet 11 of continuously fed sheets (sheet interval APC). Alternatively, the APC may be performed outside the image area as shown in FIG. 4. This method is carried out in order to ensure the light quantity level for each line and to avoid possible influences on image formation that are exerted when lines ascribed to light emission at the portion between the preceding sheet 11 and the succeeding sheet 11 are developed.

In the present specification, the initial APC refers to APC in which the semiconductor laser emits light continuously on a plurality of scanning lines. This type of APC is usually carried out during preliminary rotation in electrostatic recording. This is a way of light quantity control as a countermeasure against the disadvantage that a long time is required until a predetermined quantity of light is obtained if the quantity of light is increased stepwise from the initial value. The sheet interval APC refers to APC in which the semiconductor laser emits light on each scanning line in a non-image area, i.e., intermittently; unless otherwise indicated, this type of APC is performed at a portion between the preceding sheet and the succeeding sheet.

This method is performed preferably particularly for avoiding influences on image formation in the following cases: When laser light is emitted continuously on a plurality of lines at a portion between sheets as shown in FIG. 3, the lines are developed and adhered on the transfer roller, making the back of the sheet dirty. Moreover, both surfaces of sheets may be printed, or reverse printing may occur.

With this method, the quantity of light can be changed by one step to several steps according to a single laser lighting. Hence, a current volume set by the initial APC is used as the initial value, and the quantity of light is increased or decreased by one step on the basis of this initial value.

This type of APC which is performed by the lighting of laser light for each line need not be carried out at the interval between the sheets. It can be performed for image write scanning line, or before the recording of the first page.

Namely, the initial APC results in the continuous lighting of the semiconductor laser, whereas the sheet interval APC allows the semiconductor laser to repeat light emission for each scanning line.

As is well known, light emission from the laser diode 6 has a droop characteristic. Thus, continuous light emission leads to changes in the quantity of light emission over time. The initial APC involving continuous light emission causes fluctuations in the quantity of light emission over time, so that the quantity of light measured via the photodiode 7 takes a low value. This makes great the quantity of current volume which has been set by the control device 10 and applied to the laser diode 6 for image formation of the first page.

In the sheet interval APC, on the other hand, light emission is performed on each scanning line. Hence, light emission is completed before the quantity of light emission fluctuates, and then reemission of light takes place on a succeeding scanning line. This procedure is repeated for scanning lines. Thus, the quantity of light measured in the sheet interval APC is stabilized, and the influence of the droop characteristic of the laser diode 6 is avoided. Consequently, even if the applying current is set so as to reemit the diode with the same emission volume, there will be a difference between the emission volume after performing the initial APC and the emission volume after performing the sheet interval APC after a forced lighting signal is activated. More concretely, when the semiconductor laser is driven, the temperature of the junction varies owing to the inside transient heat resistance. At the first lighting, the temperature is low, and the efficiency of light emission is high, but as the temperature of the junction increases due to heat evolution, the efficiency of light emission decreases. Accordingly, in the case of continuous light emission, as in the initial APC, the efficiency of light emission is lower than in short-term light emission as in the sheet interval APC. Even if the same driving current is applied, the quantity of light emission differs. In case the driving current is set so as to give the same desired light quantity between the initial APC and the sheet interval APC, the quantity of light during image formation depends on which of the two types of APC has set the driving current.

As a result, when a plurality of sheets are to be recorded consecutively, the quantity of light emission for image formation on the second and later pages that is set based on the sheet interval APC is less than the quantity of light emission for image formation that is set based on the initial APC at the time of printing the first page. Thus, the image density of the first page tends to deepen compared with the image density of the second and later pages.

SUMMARY OF THE INVENTION

The object of the present invention is to provide a method of forming an image and a apparatus thereof, and a method of controlling quantity of light and a device thereof which are free from the above-described problems and which are capable of performing the APC with a simple control mechanism, without any influences of the droop characteristic of the laser diode exerted on the measurement of the quantity of light.

The light quantity control device of the present invention comprises detecting means for detecting the quantity of light emission from a light source;

control means for controlling a driving current to be applied to the light source so that the detection output of the detecting means becomes equal to a desired value; and light emission mode control means for causing the light source to emit light in a first and second emission modes for the light quantity control; wherein the control means determines the desired value for the second emission modes in accordance with output from the detection means when the driving current, which is set in the first emission mode, is applied to the light source.

The driving current set by the control means in the first emission mode may be applied to the light source after modulating the driving current with one page of image signal so as to detect the quantity of light for determining the desired value for the second emission mode.

The control means may cause a pulse light emission with a driving current set in the first emission mode, and based on a detection output on this occasion, may set the desired value in the second emission mode.

The control means also includes comparison means for comparing the detection output with the desired value, and counting means which performs a counting operation on the basis of the results of comparison obtained by the comparison means.

The light source may comprise a semiconductor laser.

A first structure of an image forming apparatus which the present invention pertains to comprise first light quantity control means for setting a first quantity of light of a light source prior to image format ion;

second light quantity control means for setting a second quantity of light of the light source during a period corresponding to a space between a preceding sheet and a succeeding sheet when a plurality of sheets are printed continuously;

storage means for storing data relating to a relationship between the first quantity of light and the second quantity of light; and control means for performing an arithmetic operation in order to correct the second quantity of light on the basis of the data stored in the storage means.

A second structure of an image forming apparatus which the present invention pertains to comprise first light quantity control means which causes a light source for image formation to emit light continuously on a plurality of scanning lines prior to the start of printing, measures the quantity of light from the light source, and sets the quantity of light for image formation on the basis of the measured quantity of light; and second light quantity control means which causes the light source to emit light on each scanning line prior to the start of printing after the quantity of light has been set by the first light quantity control means, measures the quantity of light from the light source, and further sets the quantity of light for image formation on the basis of the measured quantity of light.

The image forming apparatus further has a page number instruction detecting means. When only one page is to be printed, there is no need to actuate the second light quantity control means before printing.

A third structure of an image forming apparatus which the present invention pertains to comprise a light source for emitting a light modulated with an image signal;

means for detecting the quantity of light emitted from the light source; and light quantity control means for controlling a current to be applied to the light source in response to the detection output of the detection means prior to the image formation so as to set the current applied to the light source at the time of image formation; wherein the light quantity control means causes light to be emitted for a scanning period in areas including an image formation area prior to an image formation operation, to perform a first light quantity control, and then causes light to be emitted for a scanning period in a non-image formation area, to perform a second light quantity control.

When image formation on a plurality of pages is to be performed continuously, the above light quantity control means may cause light to be emitted for a scanning period in a non-image formation area during a non-image formation period between image formation on a preceding page and image formation on a succeeding page to perform light quantity control.

Moreover, the above-mentioned second light quantity control may be done when image formation of a plurality of pages is to be performed continuously.

The above and other objects, effects, features and advantages of the present invention will become more apparent from the following description of embodiments thereof taken in conjunction with the accompanying drawings.

DETAILED DESCRIPTION OF PREFERRED EMBODIMENTS

<Embodiment 1>

Figure 5:
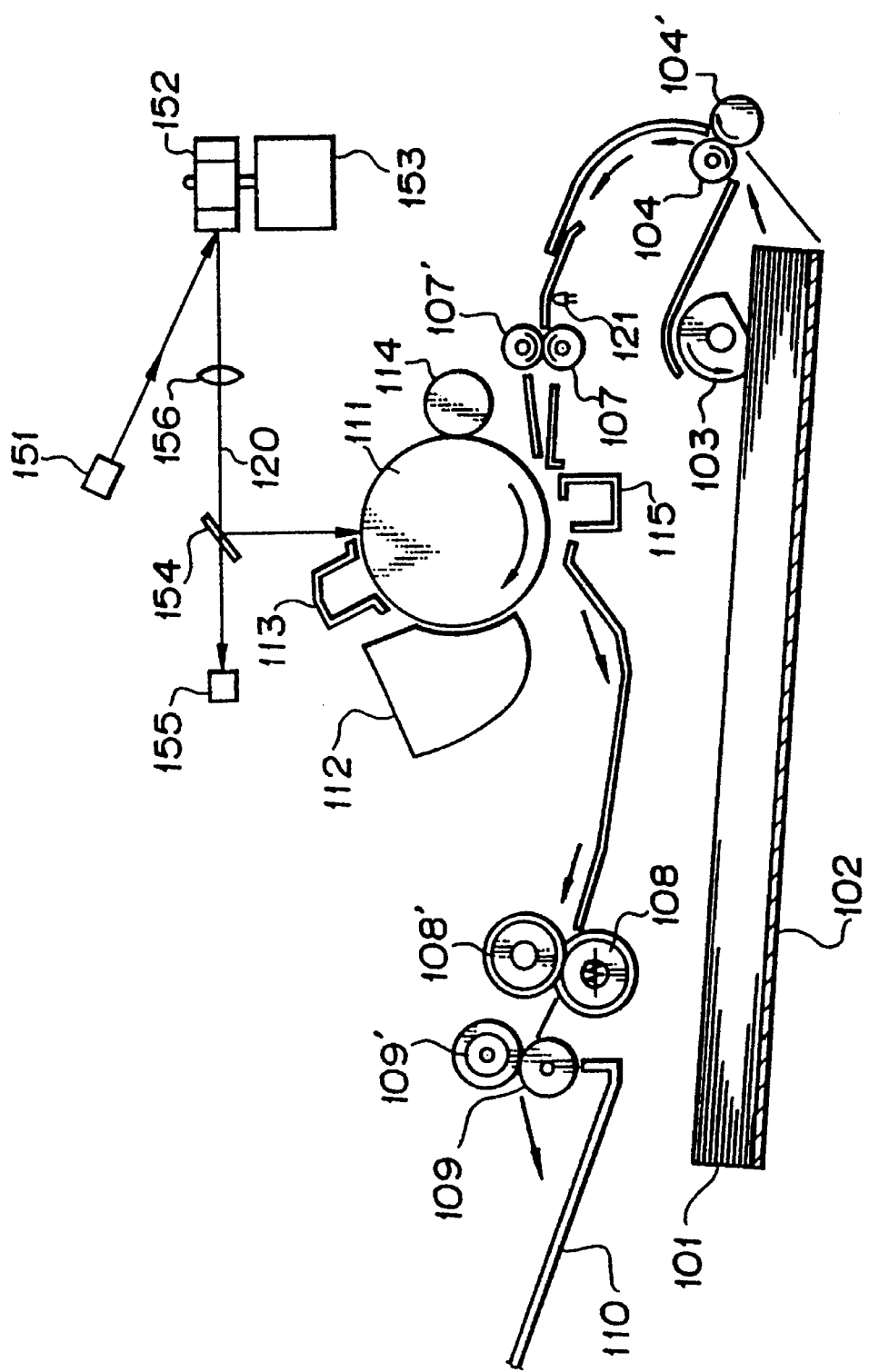
FIG. 5 is an outlined structural view showing the structure of an ordinary laser beam printer.

FIG. 5 is a circuit diagram showing the structure of a laser beam printer which the present invention is applied to. In this drawing, the reference numeral 101 denotes sheets as recording media, and 102 denotes a sheet cassette which holds the sheets 101. The reference numeral 103 denotes a sheet feed cam which separates only one sheet at the uppermost position of the sheets 101 laid on the sheet cassette 102 and brings the front end portion of the separated sheet to the position of sheet feed rollers 104, 104' by a drive means (not shown). This cam rotates intermittently at each time of sheet feeding, and feeds one sheet per rotation.

When one of the sheets 101 is conveyed by the sheet feed cam 103 to the sheet feed rollers 104, 104' and its front end reaches the position of resist rollers 107, 107' its conveyance is stopped The driving of the resist rollers 107, 107' is synchronized with the delivery timing of an image to be formed by the projection of a laser beam 120 onto a photosensitive drum 111. The reference numeral 121 denotes a photo sensor which detects whether there is any of the sheets 101.

The reference numeral 152 denotes a rotary polygon mirror which is driven by a motor 153. A laser driver (not shown) drives a semiconductor laser 151 according to dot data.

The laser beam 120 from the semiconductor laser 151 driven by the laser driver is scanned by the rotary polygon mirror 152 in the direction of main scanning. The laser beam is then passed through an f-θ lens 156 disposed between the rotary polygon mirror 152 and a reflecting mirror 154, and is guided onto the photosensitive drum 111 via the reflecting mirror 154. The laser beam 120 is projected onto the photosensitive drum 111 where it is scanned in the direction of main or horizontal scanning to form latent images on main scanning lines on the photosensitive drum 111.

A beam detector 155 disposed at the position of starting scan of the laser beam 120 detects the laser beam 120, thereby detecting a BD signal as a synchronous signal for determining the image output timing of main scanning.

The surface of the photosensitive drum 111 charged by a charger 113 has latent images formed thereon by exposure to the laser beam 120. The latent images on the portion exposed to the laser beam are converted into toner images by a developing device 114, whereafter the toner images are transferred onto the surface of the sheet 101 by a transfer charger 115. The reference numeral 112 denotes a cleaner which cleans the surface of the drum after transfer to the sheet 101.

The sheet 101 having toner images transferred thereon is then subjected to the fixing of the toner images by fixing rollers 108, 108', and discharged onto a copy receiving tray 110 by discharge rollers 109, 109'.

Figure 6:
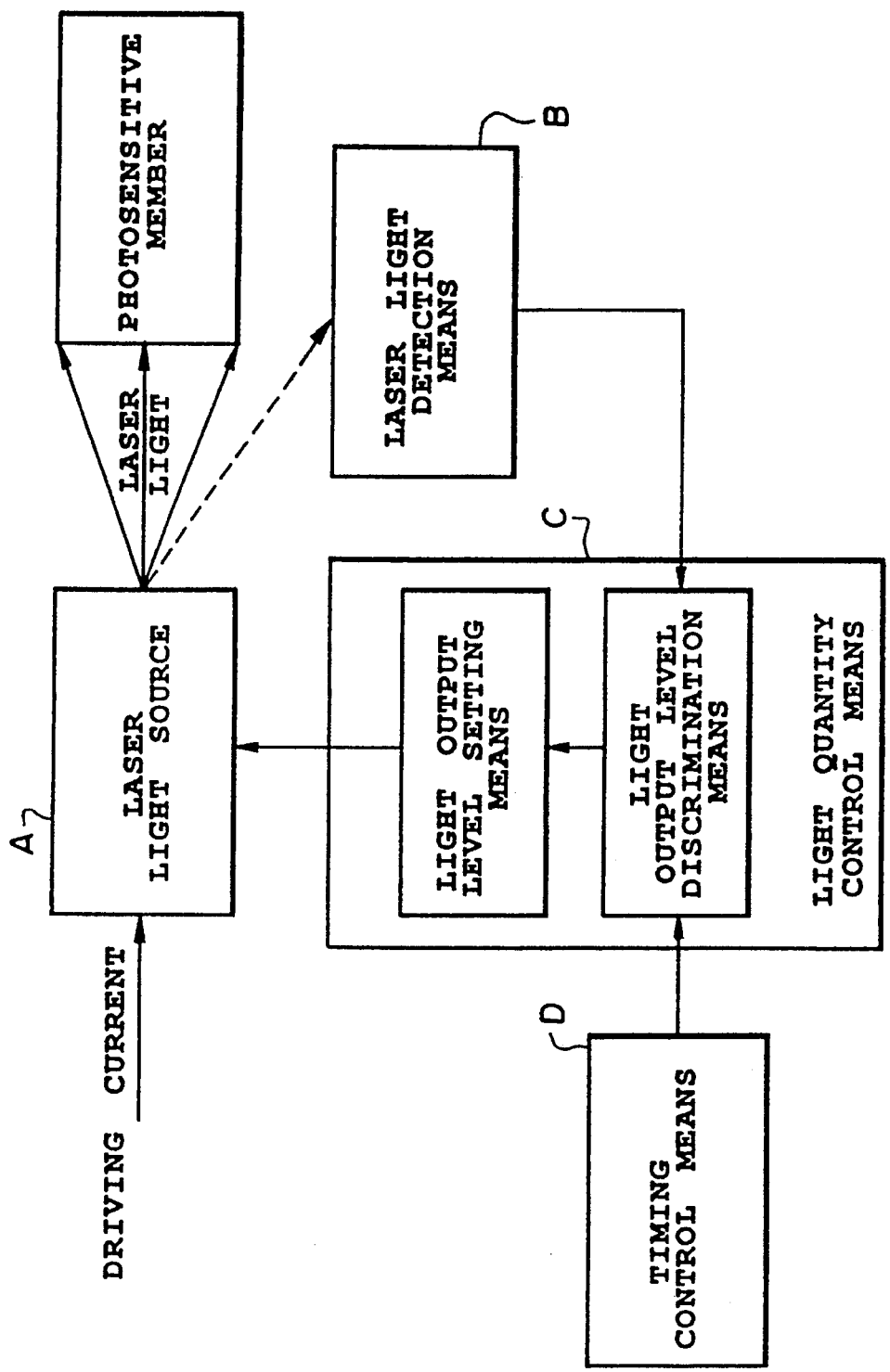
FIG. 6 is a block diagram showing a basic structure of the present invention.

FIG. 6 shows the structure of a light quantity control circuit of such a laser printer. In this drawing, the symbol A denotes a laser light source which is a semiconductor laser, and B denotes a laser light detection means (photodiode) which monitors a back beam output from the semiconductor laser A. The semiconductor laser A and the photodiode B together constitute a single laser unit. The symbol C denotes a laser light quantity control means (CPU) which controls the laser light source in accordance with output from the laser light detection means B so that a predetermined light output level can be obtained. This CPU controls the actions of the respective parts of FIG. 5, and preferably comprises a one tip microcomputer with built-in A/D converter and D/A converter.

The symbol D denotes a timing control means for controlling a timing with which the laser light quantity control means C works such that the main scanning (or horizontal scanning) and the subscanning (or vertical scanning) may be performed, respectively, in areas excluding the maximum recordable area and in areas excluding the image ensuring area an each of the front and rear ends of the recording medium.

More concretely, in the case of the initial APC, the initial APC is initiated in response to the reception of an SCNRDY signal generated when the polygon mirror 152 shown in FIG. 5 reaches a predetermined rotational speed after outputting of a print start signal. In the case of the sheet interval APC, operation is begun in synchronism with the detection of the rear end of the preceding sheet by the sensor 121.

Figure 1:
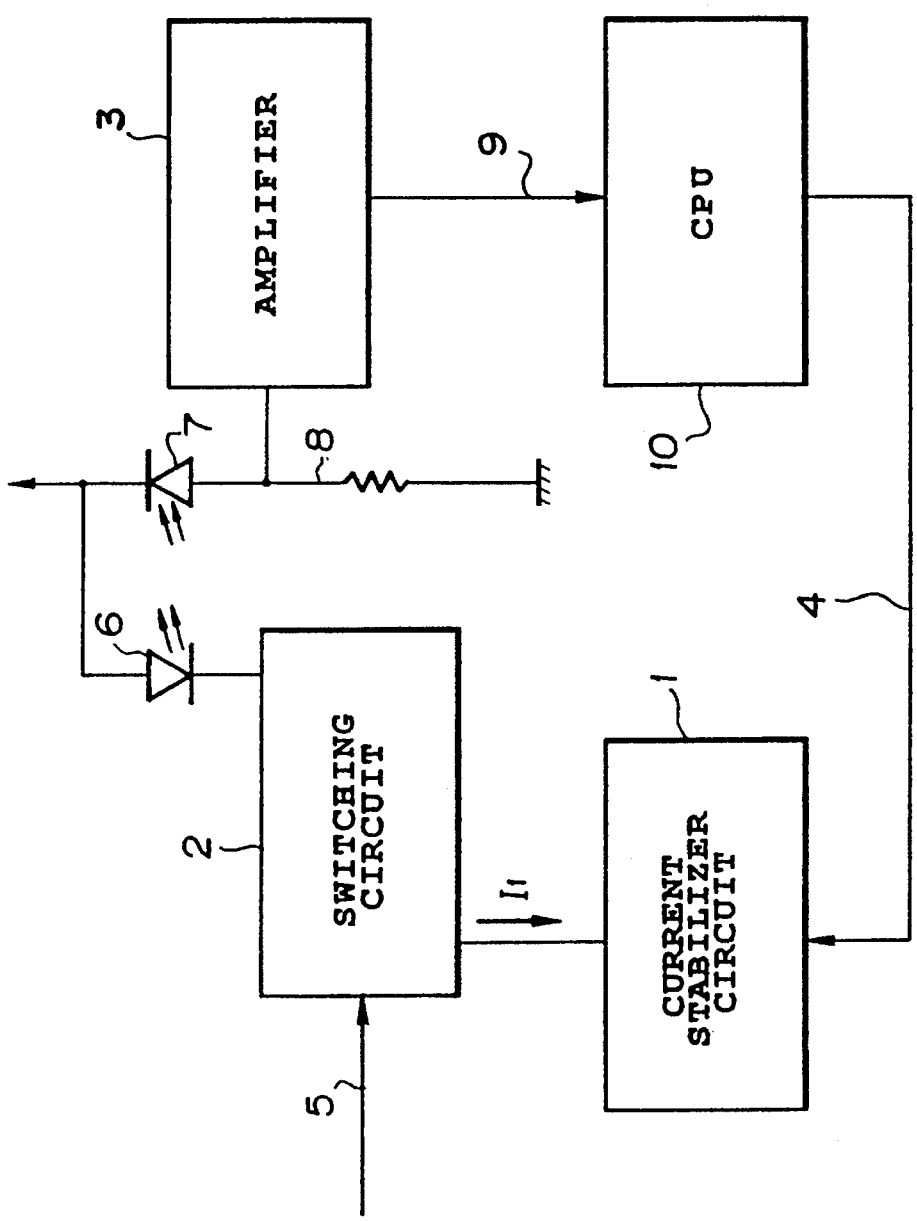
FIG. 1 is a circuit diagram showing the structure of an ordinary laser drive circuit.
Figure 2:
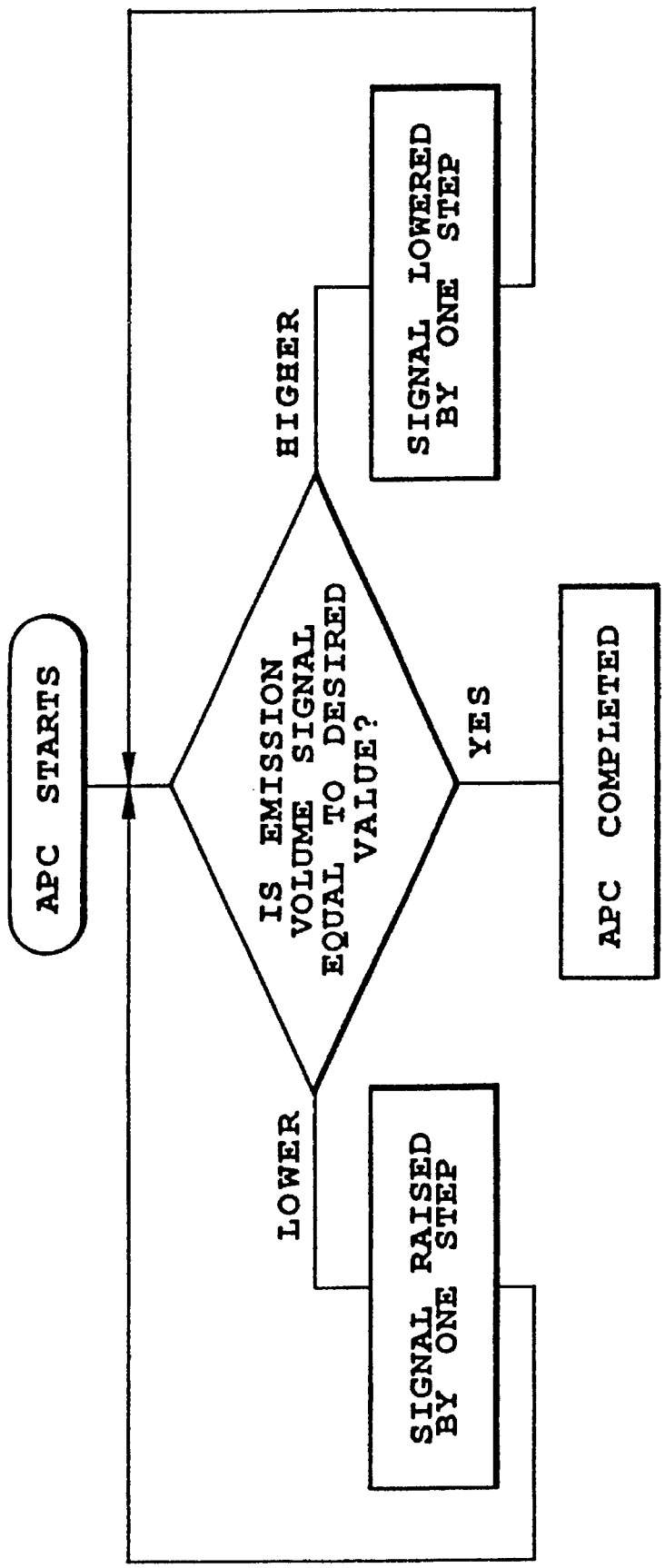
FIG. 2 is a flow chart illustrating an ordinary APC operation.
Figure 3:
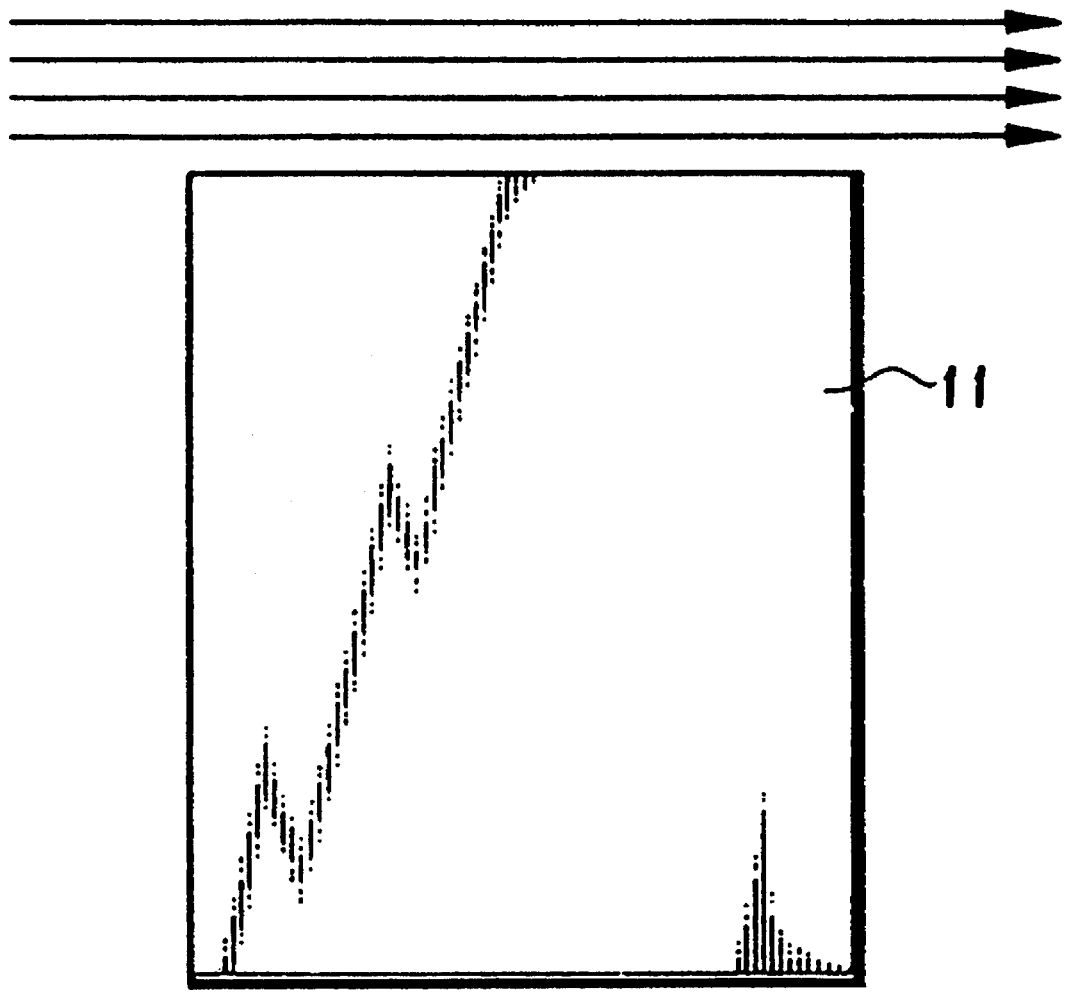
FIG. 3 is a schematic view showing an example of the position of laser scanning during the APC operation.
Figure 4:
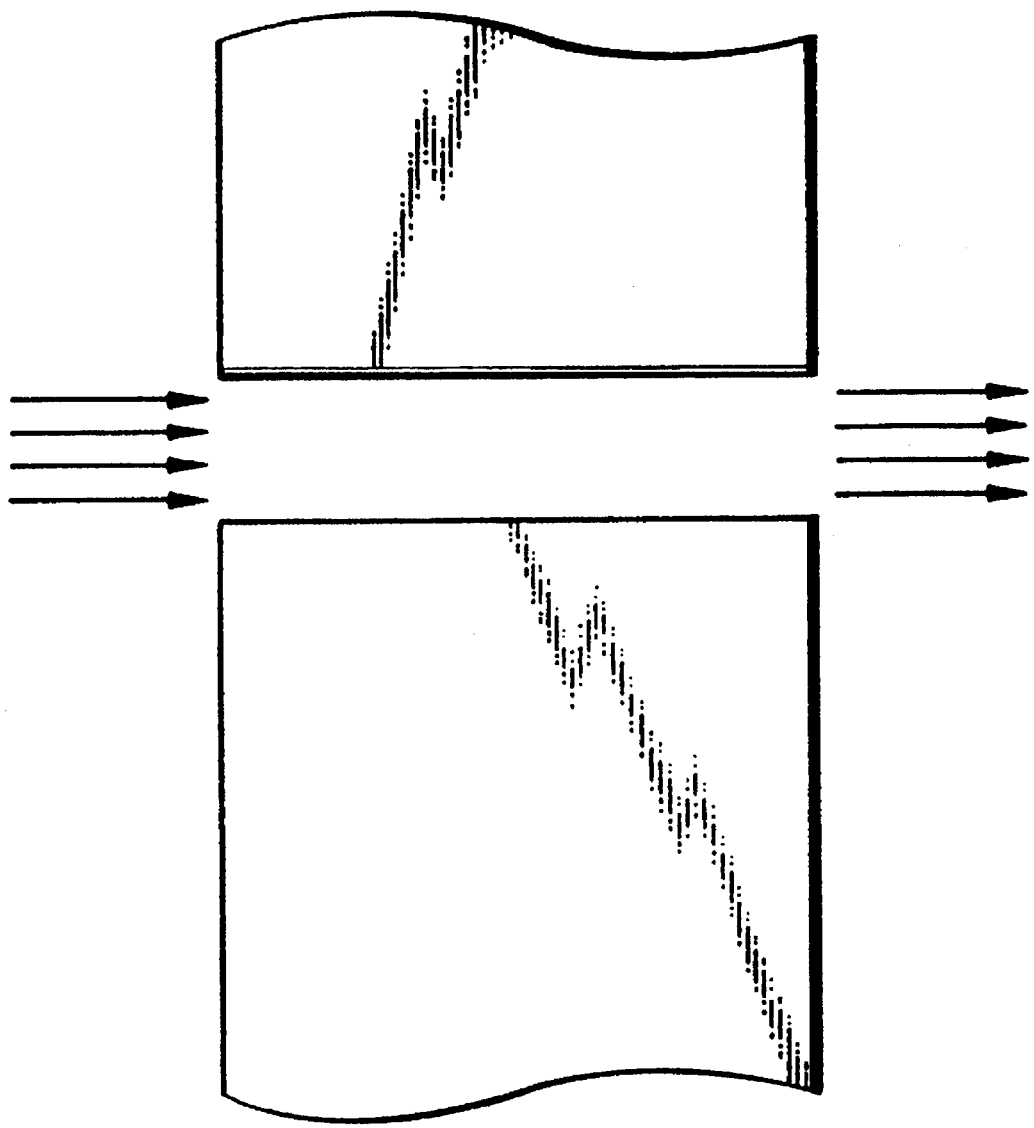
FIG. 4 is a schematic view showing another example of the position of laser scanning during the APC operation.

In the initial APC, the semiconductor laser 151 is forcibly lighted continuously on a plurality of scanning lines, during which period the operation for enhancing a light quantity signal is performed. Namely, the detection output from the photodiode B is A/D converted and compared with a reference value corresponding to the desired light quantity (intensity). Hereinafter, the reference value is referred as the desired light quantity or desired value. Based on the results of the comparison, the light quantity signal (a digital value determining the current to be applied to the semiconductor laser) is enhanced successively from the initial value. This light quantity signal is D/A converted to make a control signal for a driving current. In this embodiment, when the detection output reaches the desired value, the initial APC is completed. In order to prevent wrong operation due to noise or the like, however, it may be acceptable that two or more detection outputs from the photodiode are sampled, and if each sampled value is more than the desired light quantity, or if the results of comparison between each sampled value and the desired value are inconsistent (with the light quantity signal unchanged) a predetermined number of times, the operation is terminated. In the sheet interval APC, on the other hand, the semiconductor laser is lighted in the non-image areas of the photosensitive drum on each scanning line. During this period, the operation for increasing or decreasing the quantity of light, as shown in FIG. 2, is performed based on the light quantity signal controlled by the initial APC. According to the sheet interval APC, increasing or decreasing by one to several steps is done by a single lighting of laser. As a characteristic of the present invention, the desired light quantity (set value) for the sheet interval APC is determined separately from that for the initial APC, as will be described later on.

As described above, the initial APC in the present invention determines the current to be applied to the semiconductor laser so that the detected quantity of light becomes consistent with the predetermined target light quantity. The detected light quantity during pulsed light emission induced by the applied current is set as the desired light quantity for the sheet interval APC.

The instant embodiment will be described in more detail below.

Figure 7:
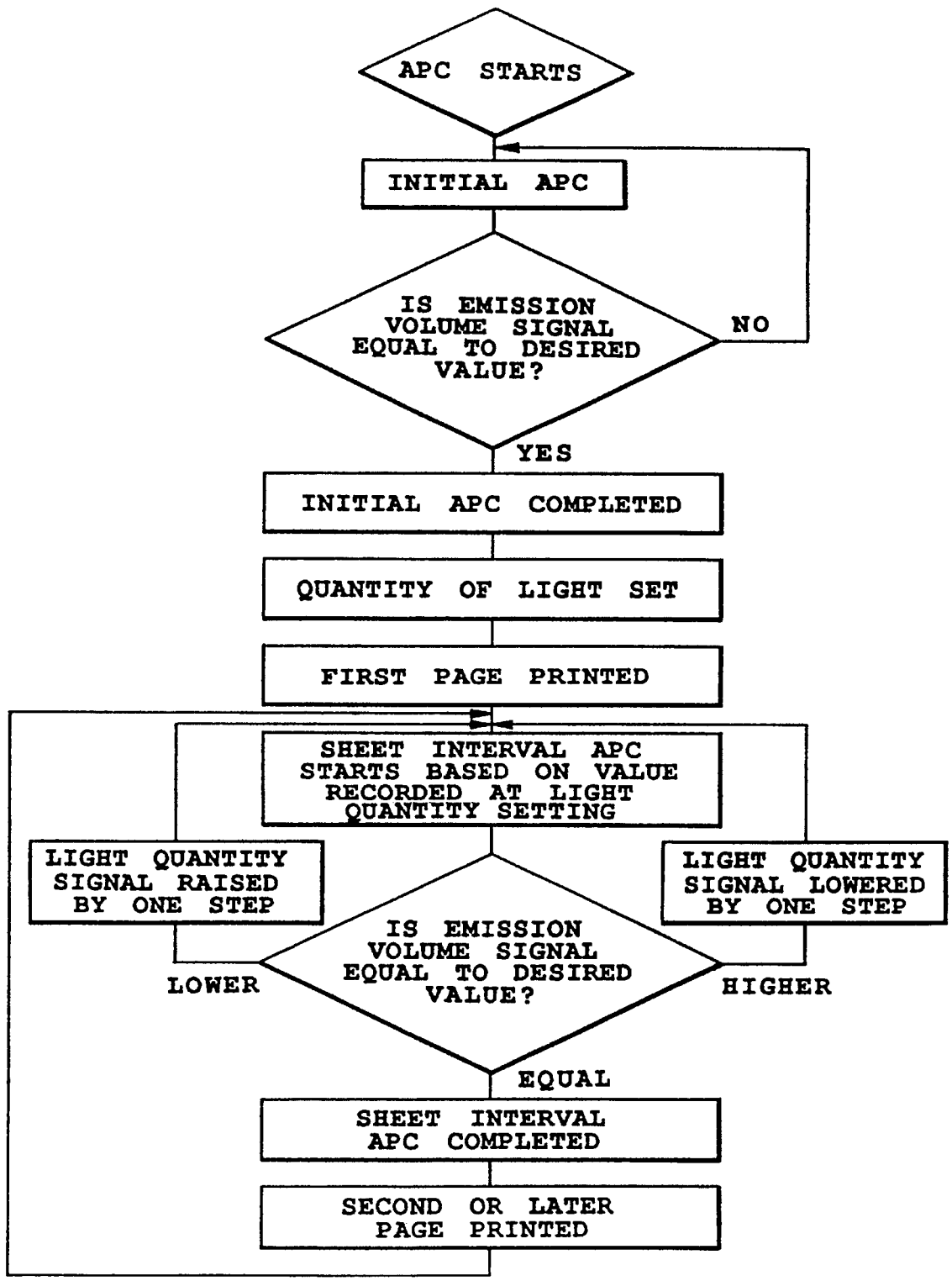
FIG. 7 is a flow chart illustrating the operation of Embodiment 1 of the present invention.

FIG. 7 illustrates the operating procedure for this embodiment.

Figure 8:
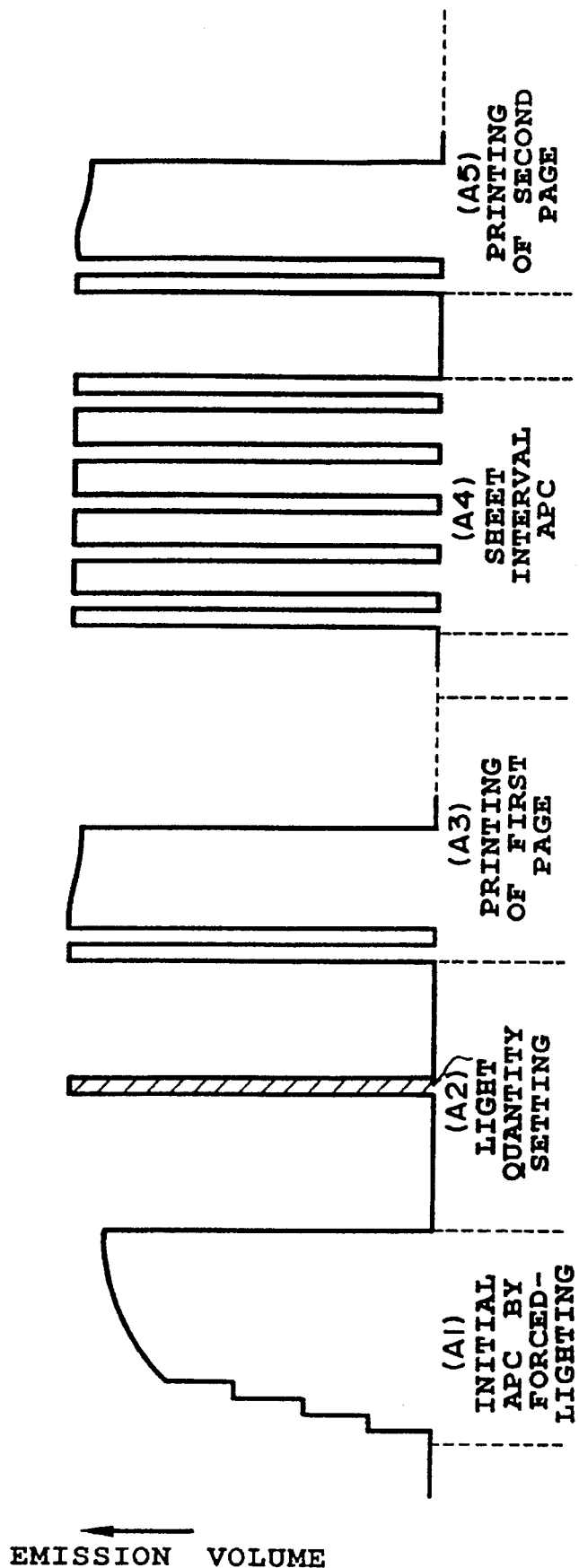
FIG. 8 is a waveform view showing the quantity of light during the operation of Embodiment 1 of the present invention.

First, the initial APC by forced-lighting is started. If the quantity of light emission is smaller than the desired value, the level of the light quantity signal is raised by one step. If the quantity of light emission is equal to the desired value, the initial APC operation is completed. Fluctuations in the laser light during this period correspond to A1 of FIG. 8. This initial APC operation takes a long time of several tens of microseconds, and thus is under the influence of the droop characteristic of the laser diode. In the instant embodiment, therefore, after completion of the initial APC operation, a pulsed light emission lasting about several tens of microseconds is provided again while the laser diode is in a fully cooled state. By detecting the quantity of light emission in this case, the quantity of light is set (A2 of FIG. 8). The value obtained by this setting is stored, and used as a set value (target light quantity) for the sheet interval APC (A4 of FIG. 8) which is performed after completion of the printing of the first page (A3 of FIG. 8) in the continuous recording of plural pages. In the sheet interval APC, if the quantity of light emission is smaller than the above set value, the level of the light quantity signal is raised by one step; if the quantity of light emission is larger than the above set value, the level of the light quantity signal is lowered by one step. If the quantity of light emission is equal to the set value, the APC operation is completed (A4 of FIG. 8). After such operation, the printing of the second page is carried out (A5 of FIG. 8), and the same operation is performed for the third and later pages.

The above-described processing enables the accurate control of the quantity of laser light and the formation of high quality images.

<Embodiment 2>

Figure 9:
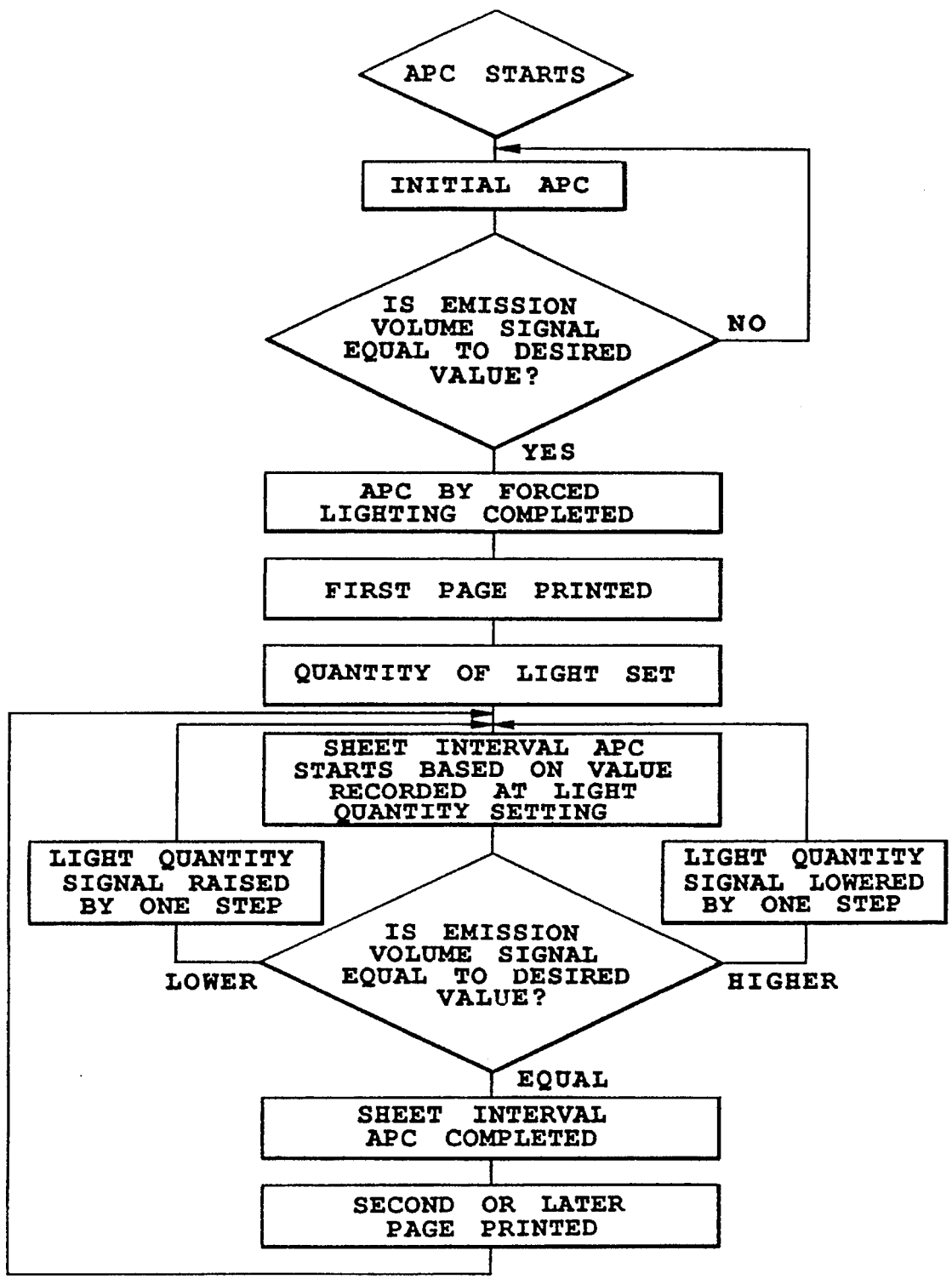
FIG. 9 is a flow chart illustrating the operation of Embodiment 2 of the present invention.

The second embodiment of the present invention will be described herein. FIG. 9 illustrates the operating procedure for Embodiment 2.

Figure 10:
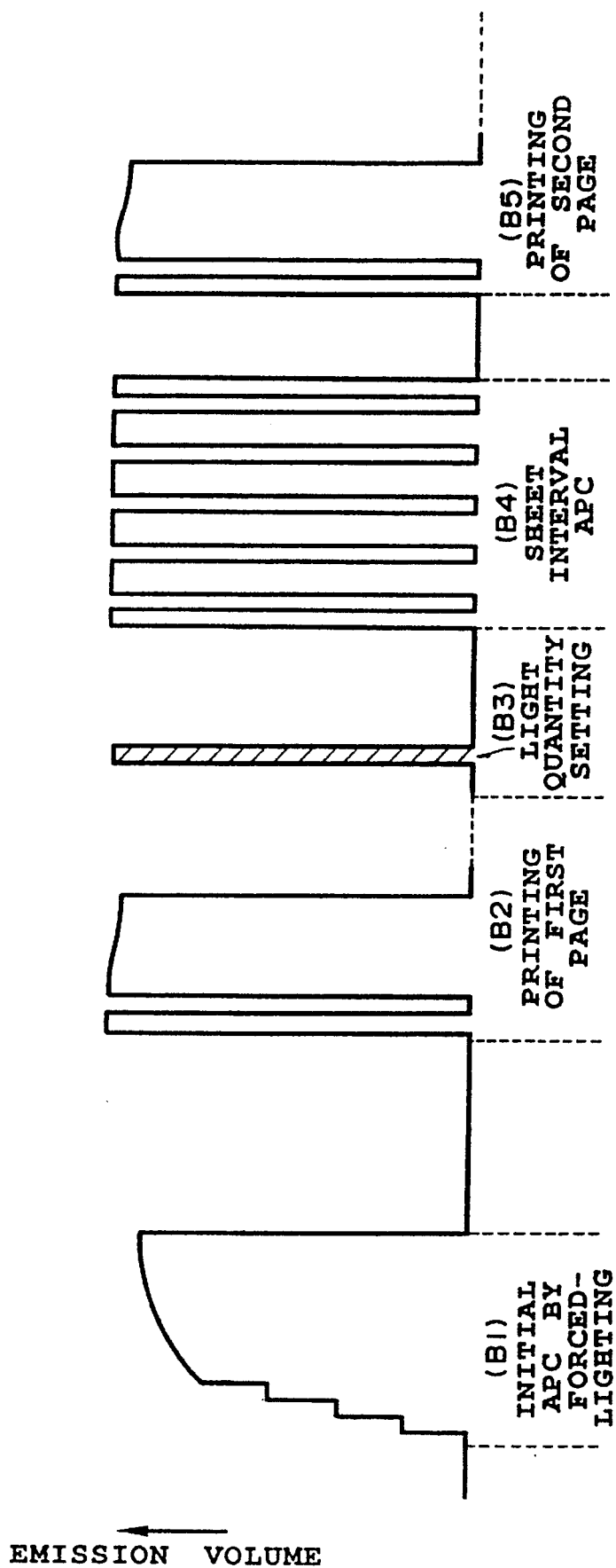
FIG. 10 is a waveform view showing the quantity of light during the operation of Embodiment 2 of the present invention.

The initial APC by forced-lighting is started in the same manner as in Embodiment 1. If the quantity of light emission is smaller than the desired value, the level of the light quantity signal is raised by one step. If the quantity of light emission is equal to the desired value, the initial APC operation is completed. Fluctuations in the laser light during this period correspond to B1 of FIG. 10. This initial APC operation is under the influence of the droop characteristic of the laser diode as in the case of Embodiment 1. In the instant embodiment, therefore, after completion of the printing of the first page (B2 of FIG. 10), a pulsed light emission lasting about several tens of microseconds is provided while the laser diode is in a fully cooled state, whereby the quantity of light is set (B3 of FIG. 10). The value obtained by this setting is stored, and used as a set value for the sheet interval APC (B4 of FIG. 10) which is performed immediately before the printing of the second page (B5 of FIG. 10) in the continuous recording of plural pages. Then, the sheet interval APC is performed. If the quantity of light emission is smaller than the above set value, the level of the light quantity signal is raised by one step; if the quantity of light emission is larger than the set value, the level of the light quantity signal is lowered by one step. If the quantity of light emission is equal to the set value, the APC operation is completed. After such operation, the printing of the second page is carried out (B5), and the same operation is performed for the third and later pages.

The above-described processing enables the accurate control of the quantity of laser light and the formation of high quality images.

<Embodiment 3>

Figure 11:
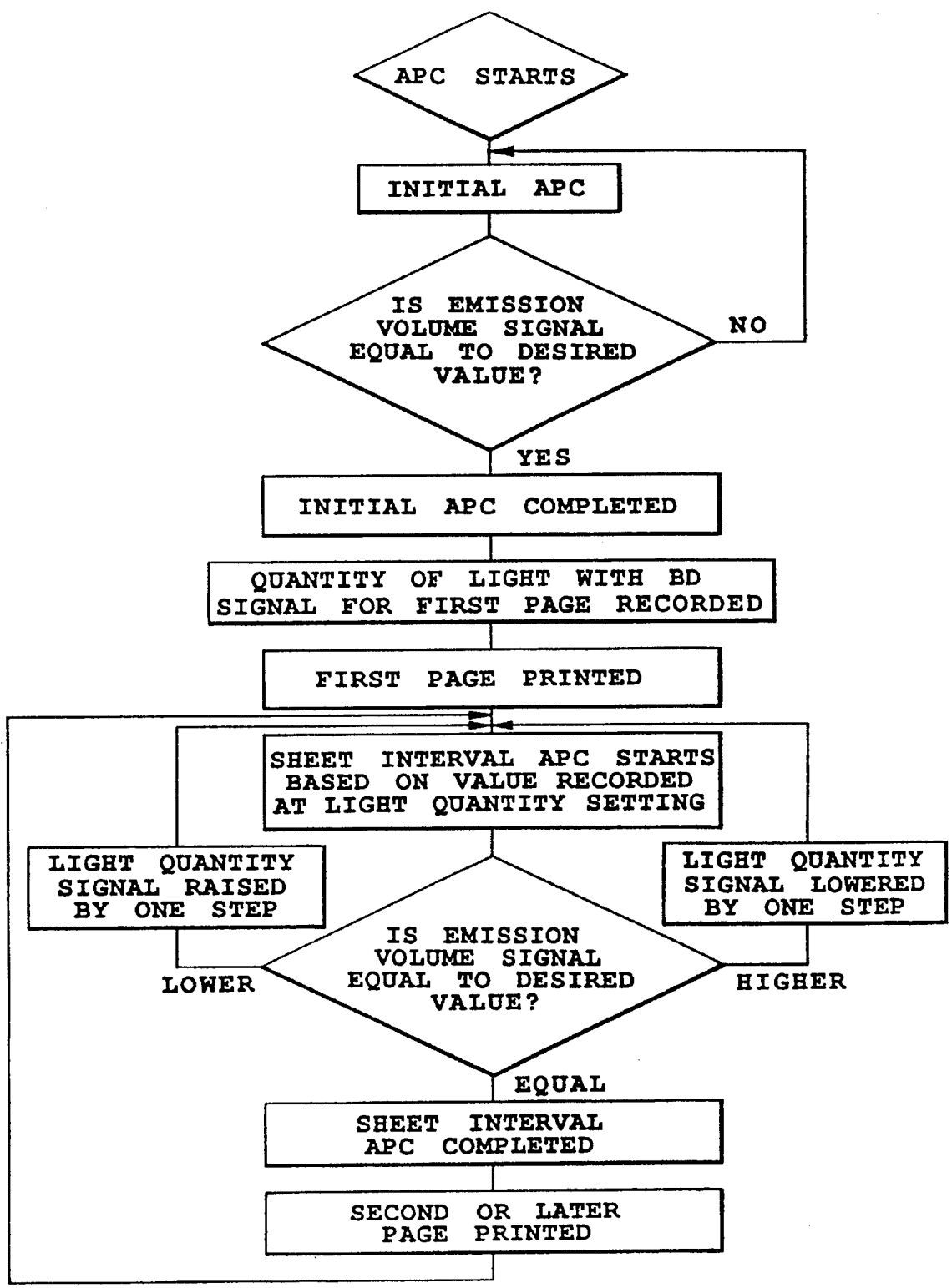
FIG. 11 is a flow chart illustrating the operation of Embodiment 3 of the present invention.

The third embodiment of the present invention will be described herein. FIG. 11 illustrates the operating procedure for Embodiment 3.

Figure 12:
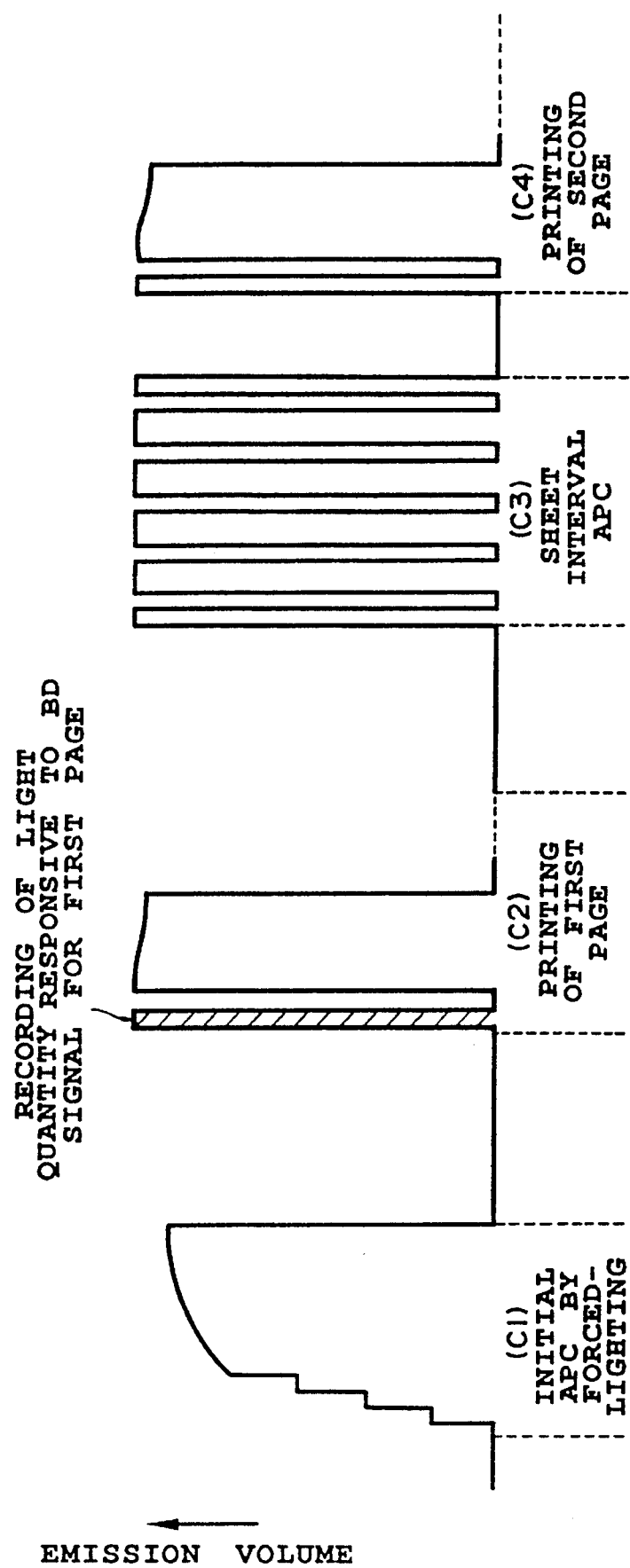
FIG. 12 is a waveform view showing the quantity of light during the operation of Embodiment 3 of the present invention.

The initial APC by forced-lighting is started in the same manner as in Embodiment 1. If the quantity of light emission is smaller than the desired value, the level of the light quantity signal is raised by one step. If the quantity of light emission is equal to the desired value, the initial APC operation is completed. Fluctuations in the laser light during this period correspond to C1 of FIG. 12. This initial APC operation is under the influence of the droop characteristic of the laser diode as in the case of Embodiment 1. Therefore, the quantity of light emission in response to BD signal of several tens of microseconds duration which acts immediately before the printing of the first page (C2 of FIG. 12) is recorded. This quantity is used as a set value for the sheet interval APC (C3 of FIG. 12) which is performed after completion of the printing of the first page (C2 of FIG. 12) in the continuous recording of plural pages. Then, the sheet interval APC is performed as in Embodiment 1 (C3 of FIG. 12). After such operation, the printing of the second page is carried out (C4 of FIG. 12), and the same operation is performed for the third and later pages.

<Embodiment 4>

Figure 13:
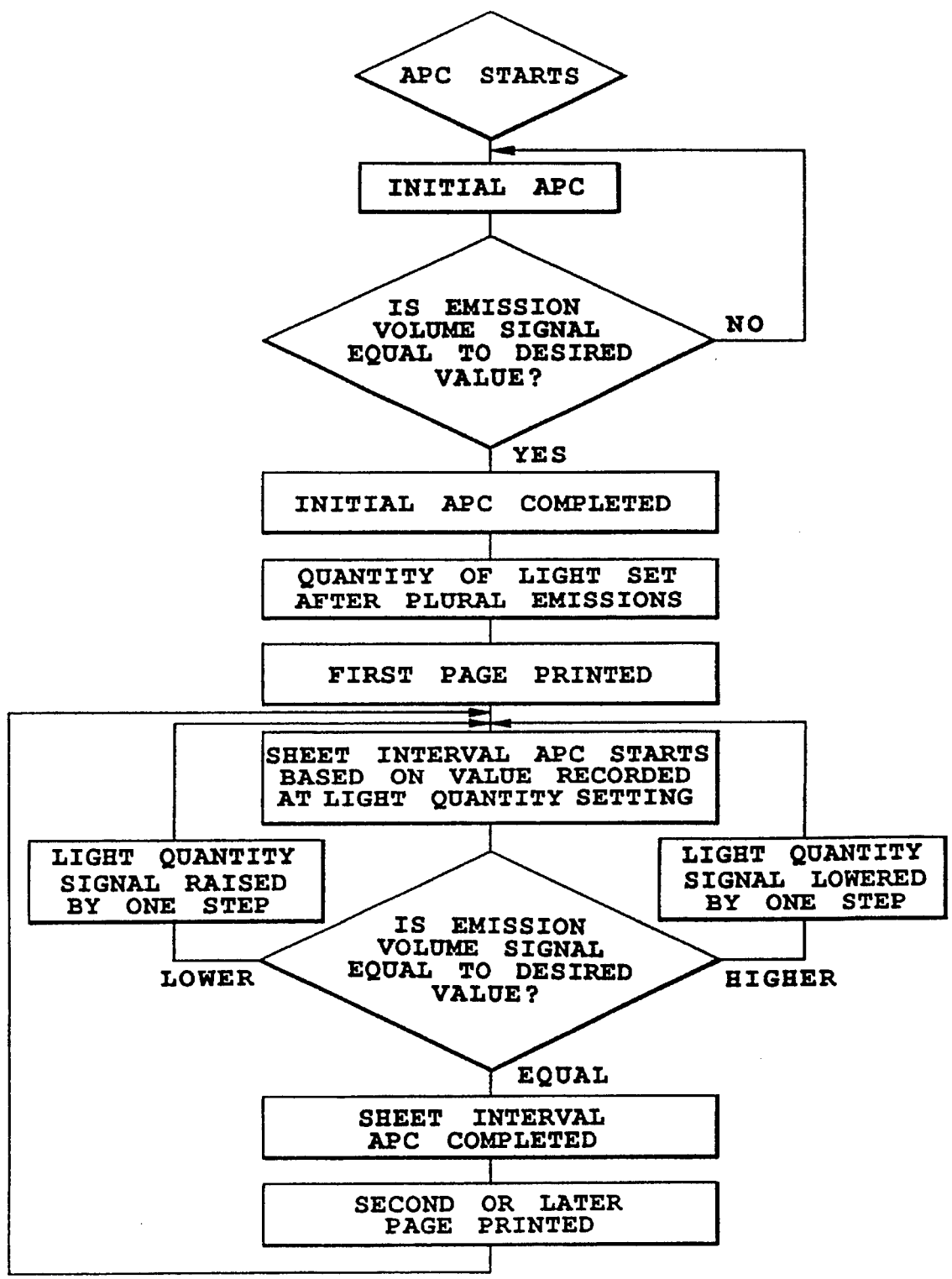
FIG. 13 is a flow chart illustrating the operation of Embodiment 4 of the present invention.

The fourth embodiment of the present invention will be described herein. FIG. 13 illustrates the operating procedure for Embodiment 4.

Figure 14:
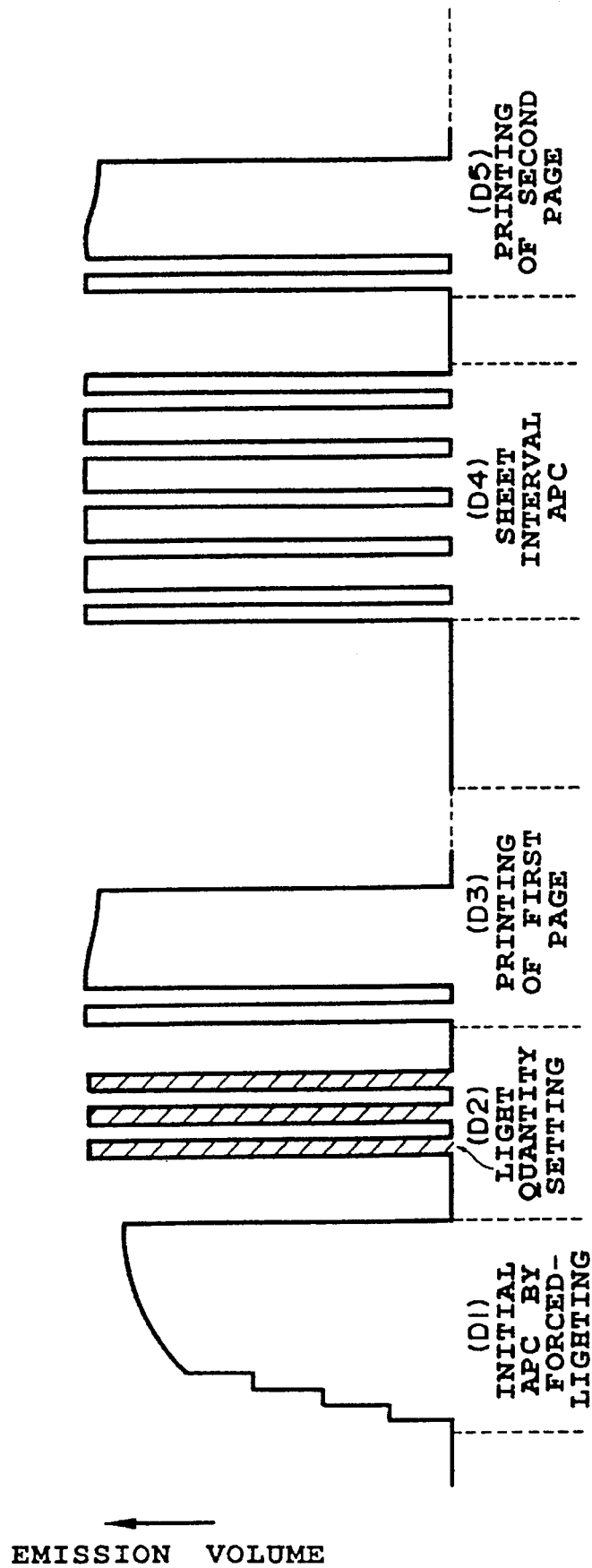
FIG. 14 is a waveform view showing the quantity of light during the operation of Embodiment 4 of the present invention.

The initial APC by forced-lighting is started in the same manner as in Embodiment 1. If the quantity of light emission is smaller than the desired value, the level of the light quantity signal is raised by one step. If the quantity of light emission is equal to the desired value, the initial APC operation is completed. Fluctuations in the laser light during this period correspond to D1 of FIG. 14. This initial APC operation is under the influence of the droop characteristic of the laser diode as in the case of Embodiment 1. Therefore, after completion of the initial APC operation, an arithmetic processing is performed in which a pulsed flight emission lasting about several tens of microseconds is provided several times while the laser diode is in a fully cooled state, and the average of the resulting quantities of light emissions is ,calculated (D2 of FIG. 14). The value obtained by this arithmetic processing is recorded as a set value of the quantity of light. This value is then used as a set value for the sheet interval APC (D4 of FIG. 14 ) which is performed after completion of the printing of the first page (D3 of FIG. 14) in the continuous recording of plural pages. Then, the sheet interval APC is performed as in Embodiment 1 (D4 of FIG. 14 ). After such operation, the printing of the second page is carried out (D5 of FIG. 14), and the same operation is performed for the third and later pages.

<Embodiment 5>

Figure 15:
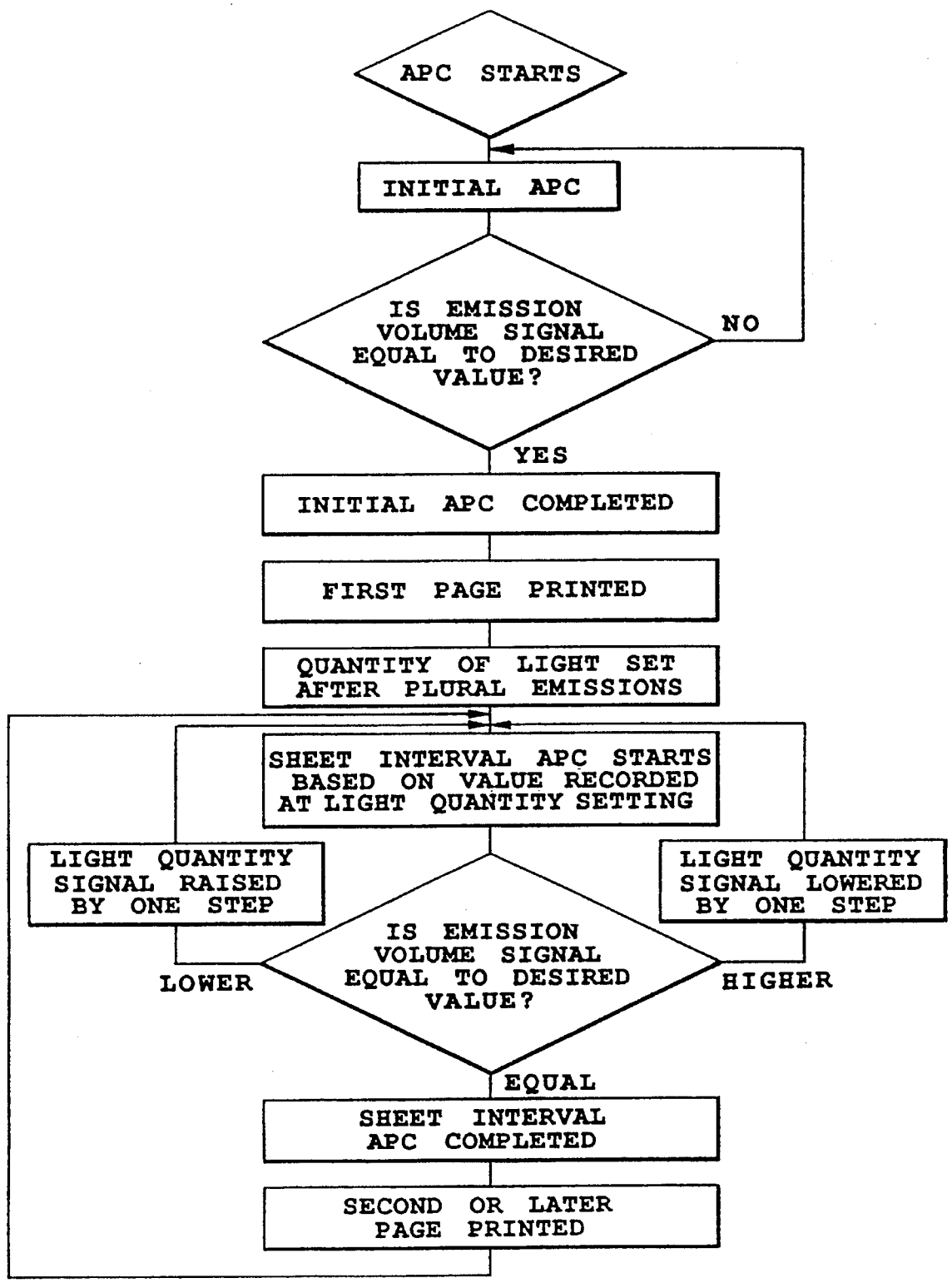
FIG. 15 is a flow chart illustrating the operation of Embodiment 5 of the present invention.

The fifth embodiment of the present invention will be described herein. FIG. 15 illustrates the operating procedure for Embodiment 5.

Figure 16:
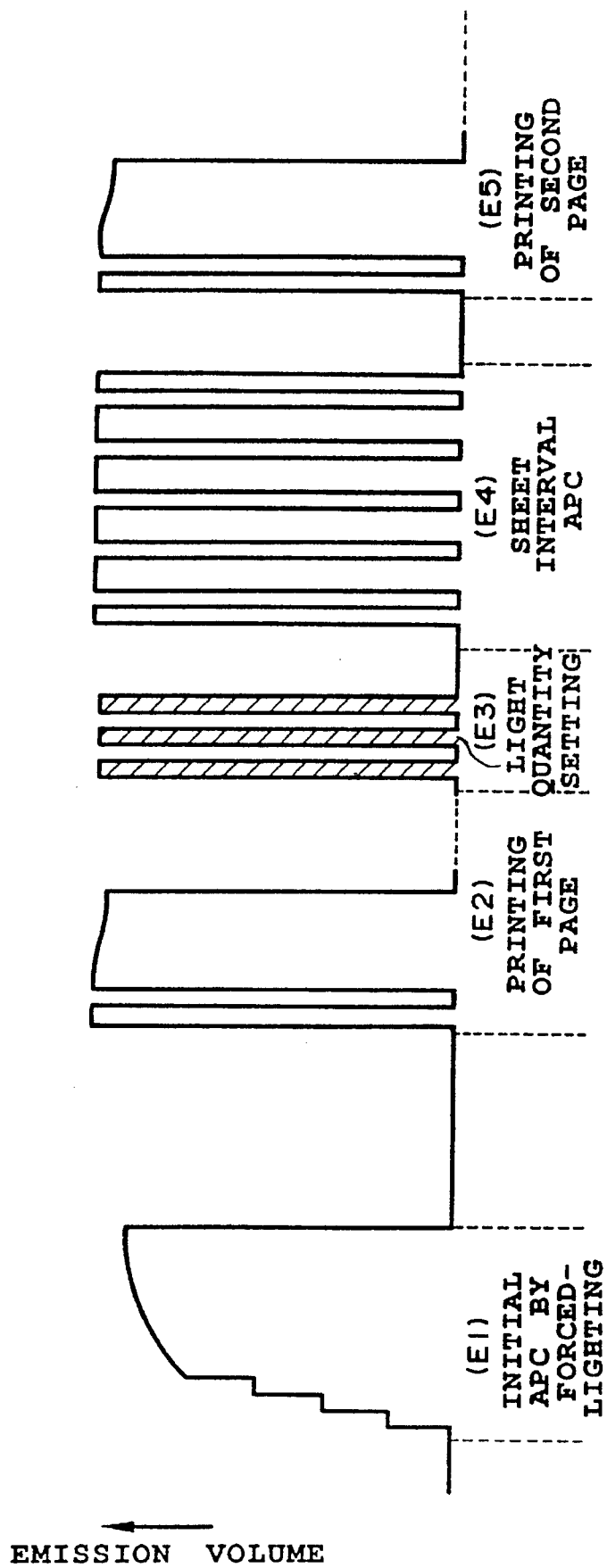
FIG. 16 is a waveform view showing the quantity of light during the operation of Embodiment 5 of the present invention.

The initial APC by forced-lighting is started in the same manner as in Embodiment 1. If the quantity of light emission is smaller than the desired value, the level of the light quantity signal is raised by one step. If the quantity of light emission is equal to the desired value, the initial APC operation is completed. Fluctuations in the laser light during this period correspond to E1 of FIG. 16. This initial. APC operation is under the influence of the droop characteristic of the laser diode as in the case of Embodiment 1. Therefore, after completion of the printing of the first page (E2 of FIG. 16), an arithmetic processing is performed in which a pulsed light emission lasting about several tens of microseconds is provided several times while the laser diode is in a fully cooled state, and the average of the resulting quantities of light emissions is calculated (E3 of FIG. 16). The value obtained by this arithmetic processing is recorded as a set value of the quantity of light. This value is then used as a set value for the sheet interval APC (E4 of FIG. 16) which is performed immediately before the printing of the second page (E5 of FIG. 16) in the continuous recording of plural pages. Then, the sheet interval APC is performed in the same manner as in Embodiment 1. After such operation, the printing of the second page is carried out (E5 of FIG. 16), and the same operation is performed for the third and later pages.

<Embodiment 6>

Figure 17:
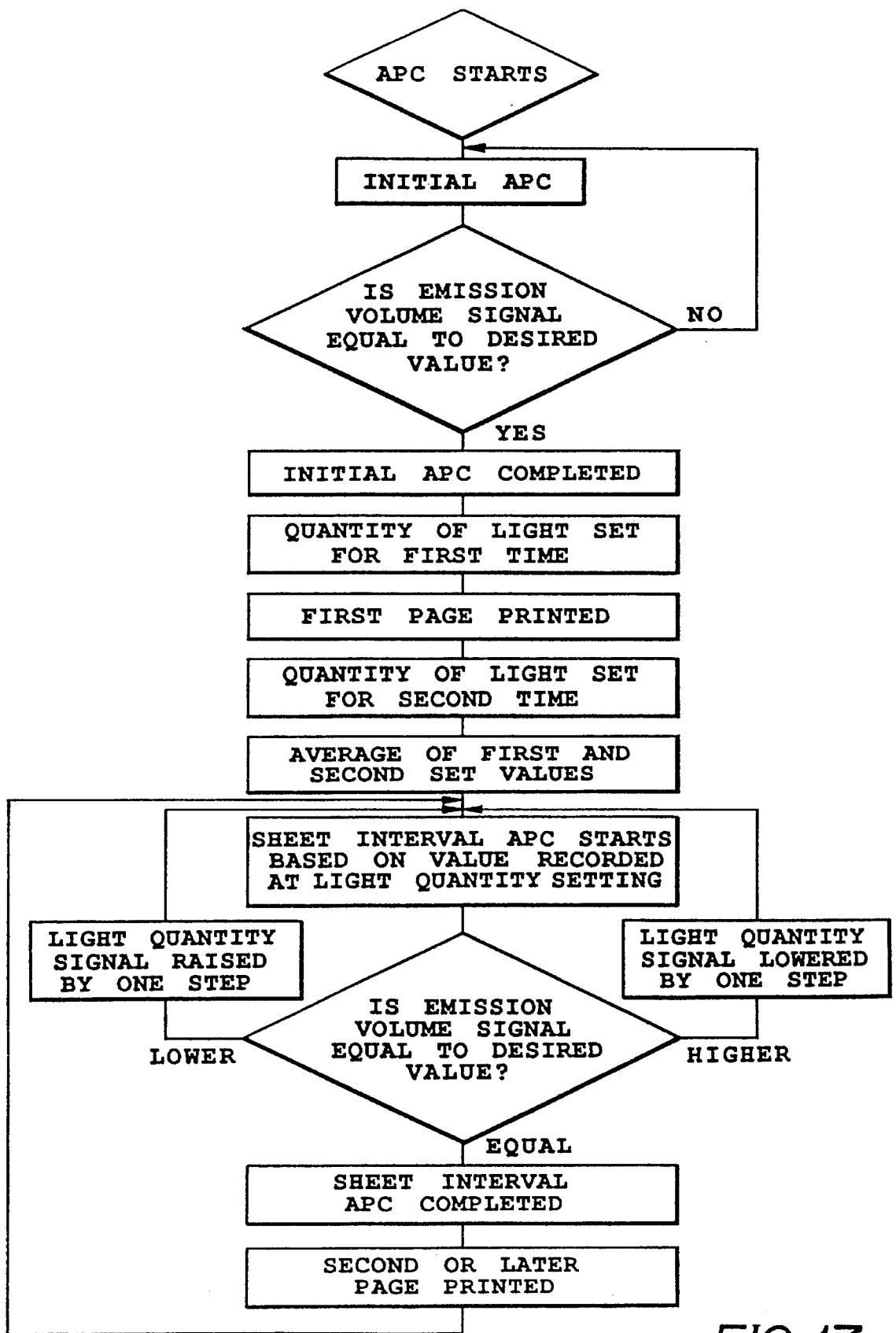
FIG. 17 is a flow chart illustrating the operation of Embodiment 6 of the present invention.

The sixth embodiment of the present invention will be described herein. FIG. 17 illustrates the operating procedure for Embodiment 6.

Figure 18:
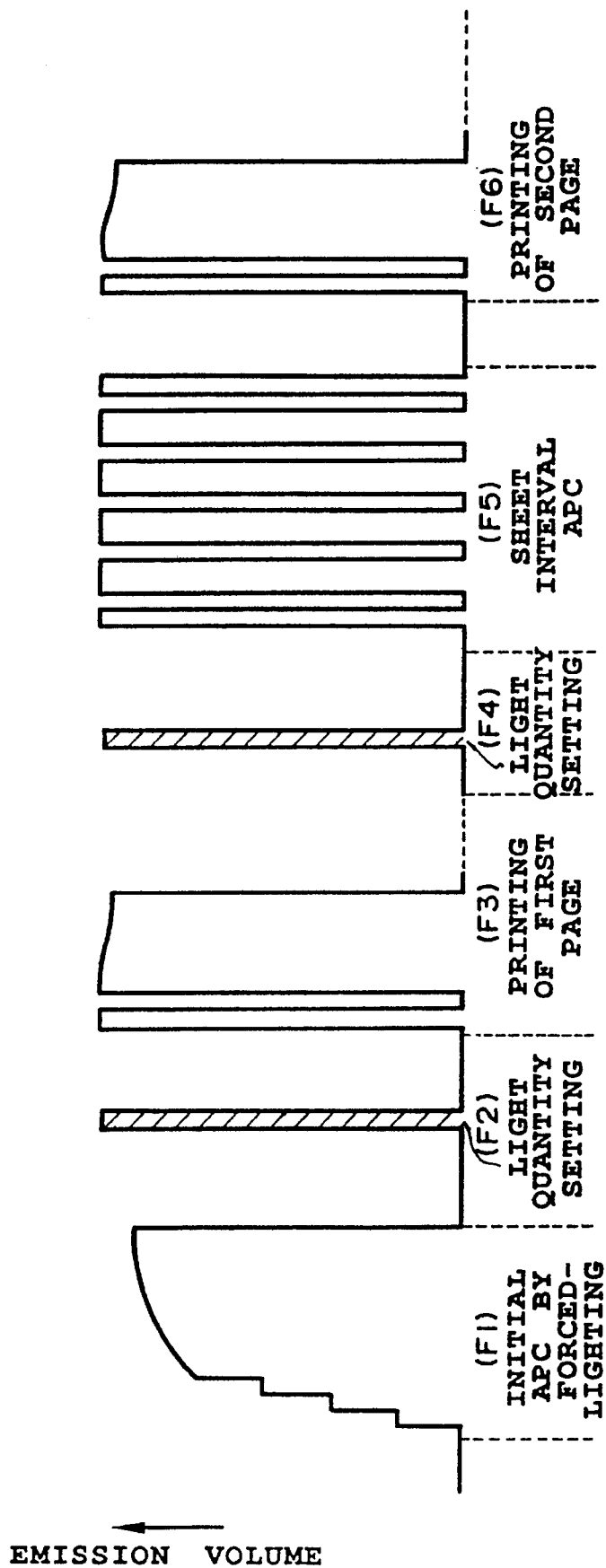
FIG. 18 is a waveform view showing the quantity of light during the operation of Embodiment 6 of the present invention.

The initial APC by forced-lighting is started in the same manner as in Embodiment 1. If the quantity of light emission is smaller than the desired value, the level of the light quantity signal is raised by one step. If tine quantity of light emission is equal to the desired value, the initial APC operation is completed. Fluctuations in the laser light during this period correspond to F1 of FIG. 18. This initial APC operation is under the influence of the droop characteristic of the laser diode as in the case of Embodiment 1. Therefore, after completion of the initial APC operation, a pulsed light emission lasting about several tens of microseconds is provided while the laser diode is in a fully cooled state, and the resulting quantity of light emission is recorded (F2 of FIG. 18). After completion of the printing of the first page (F3 of FIG. 18), a pulsed light emission lasting about several tens of microseconds is provided again while the laser diode is in a fully cooled state, and the resulting quantity of light emission is recorded (F4 of FIG. 18). The average of the former quantity of light emission (F2 of FIG. 18) and the latter quantity of light emission (F4 of FIG. 18) is calculated. The value obtained by this calculation is recorded as a set value of the quantity of light. This value is then used as a set value for the sheet interval APC (F5 of FIG. 18) which is performed immediately before the printing of the second page in the continuous recording of plural pages. Then, the sheet interval APC is performed in the same manner as in Embodiment 1. After such operation, the printing of the second page is carried out (F6 of FIG. 18), and the same operation is performed for the third and later pages.

<Embodiment 7>

Figure 19:
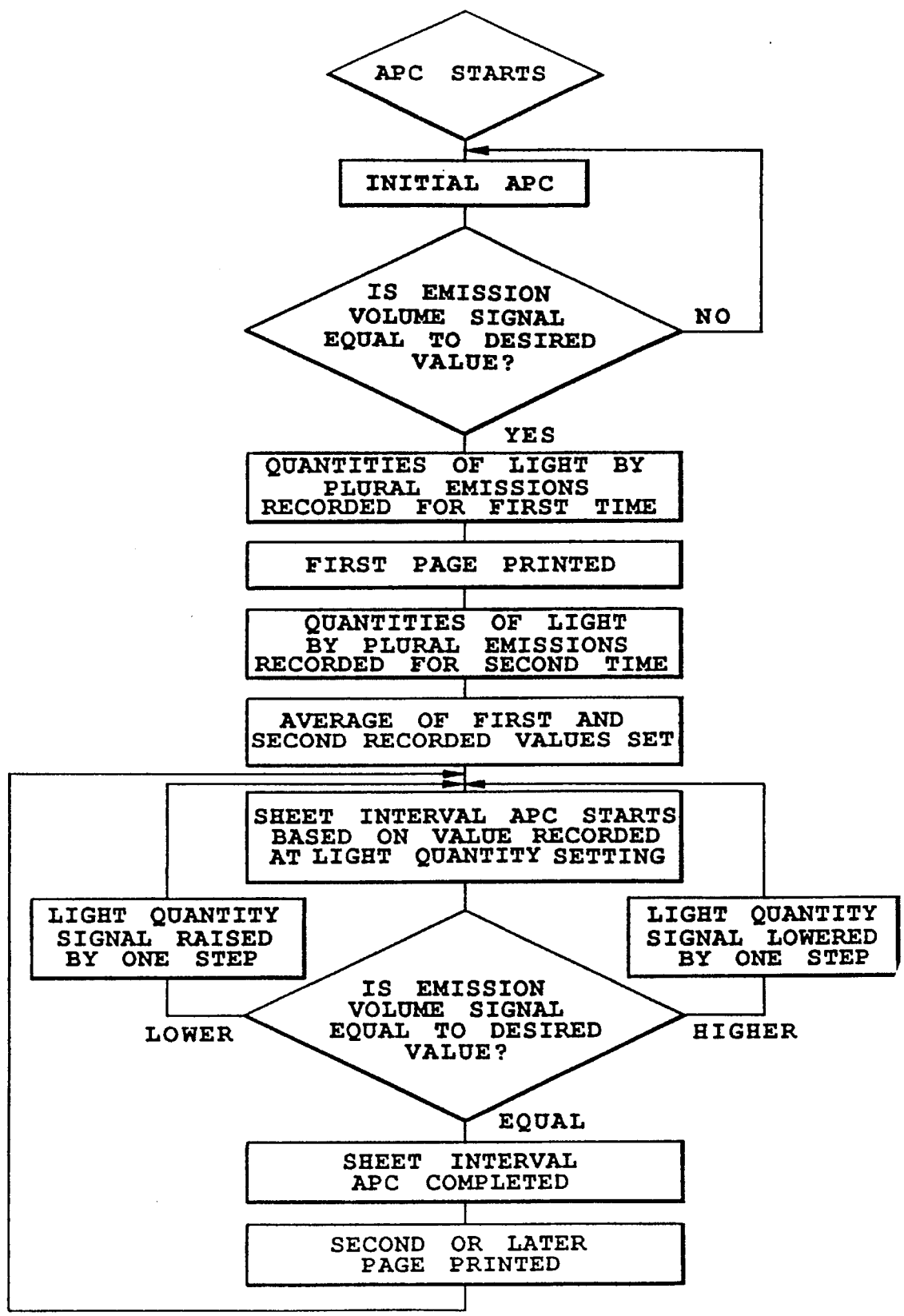
FIG. 19 is a flow chart illustrating the operation of Embodiment 7 of the present invention.

The seventh embodiment of the present invention will be described herein. FIG. 19 illustrates the operating procedure for Embodiment 7.

Figure 20:
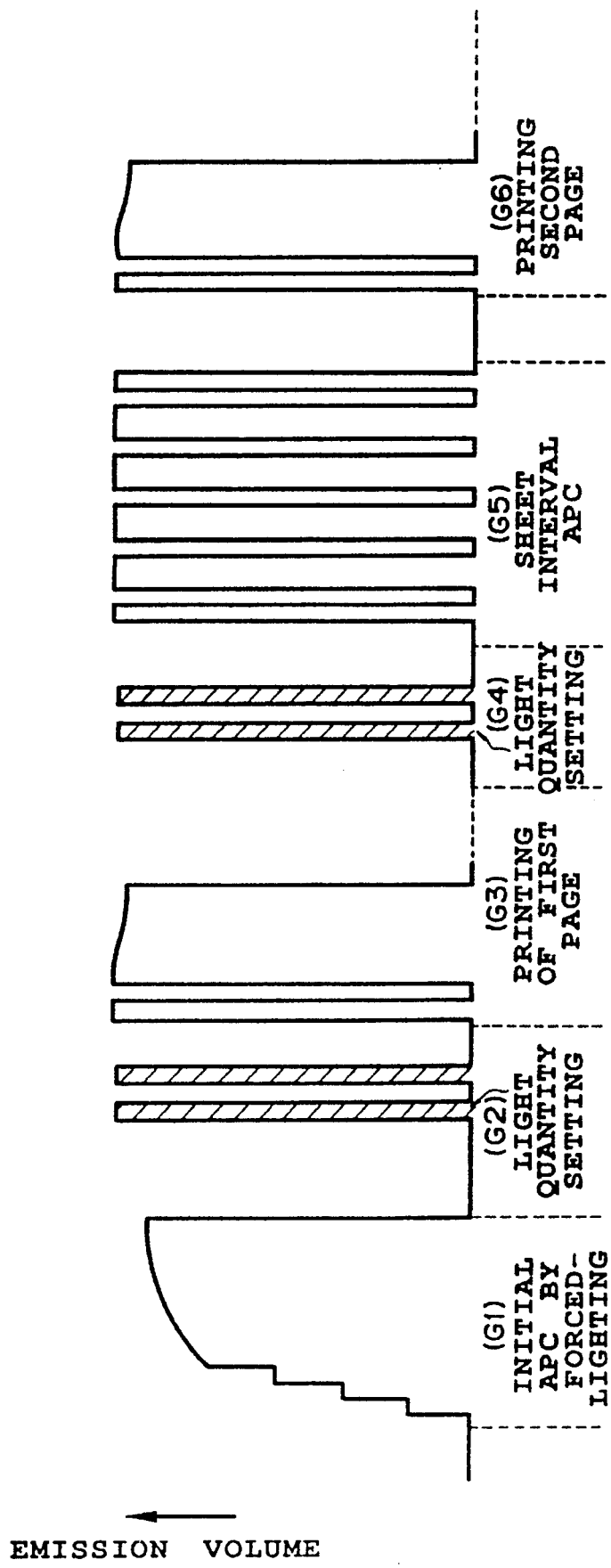
FIG. 20 is a waveform view showing the quantity of light during the operation of Embodiment 7 of the present invention.

The initial APC by forced-lighting is started in the same manner as in Embodiment 1. If the quantity of light emission is smaller than the desired value, the level of the light quantity signal is raised by one step. If the quantity of light emission is equal to the desired value, the initial APC operation is completed. Fluctuations in the laser light during this period correspond to G1 of FIG. 20. This initial. APC operation is under the influence of the droop characteristic of the laser diode as in the case of Embodiment 1. Therefore, after completion of the initial APC operation, several pulsed light emissions each lasting about several tens of microseconds are provided while the laser diode is in a fully cooled state, and the resulting quantities of light emissions are recorded (G2 of FIG. 20). After completion of the printing of the first page (G3 of FIG. 20), pulsed light emissions each lasting about several tens of microseconds are provided again while the laser diode is in a fully cooled state, and the resulting quantities of light emissions are recorded (G4 of FIG. 20). The average of the former quantities of light emissions (G2 of FIG. 20) and the latter quantities of light emissions (G4 of FIG. 20) is calculated. The value obtained by this calculation is recorded as a set value of the quantity of light. This value is then used as a set value for the sheet interval APC (G5 of FIG. 20) which is performed immediately before the printing of the second page in the continuous recording of plural pages. Then, the sheet interval APC is performed in the same manner as in Embodiment 1. After such operation, the printing of the second page is carried out (G6 of FIG. 20), and the same operation is performed for the third and later pages.

<Embodiment 8>

Figure 21:
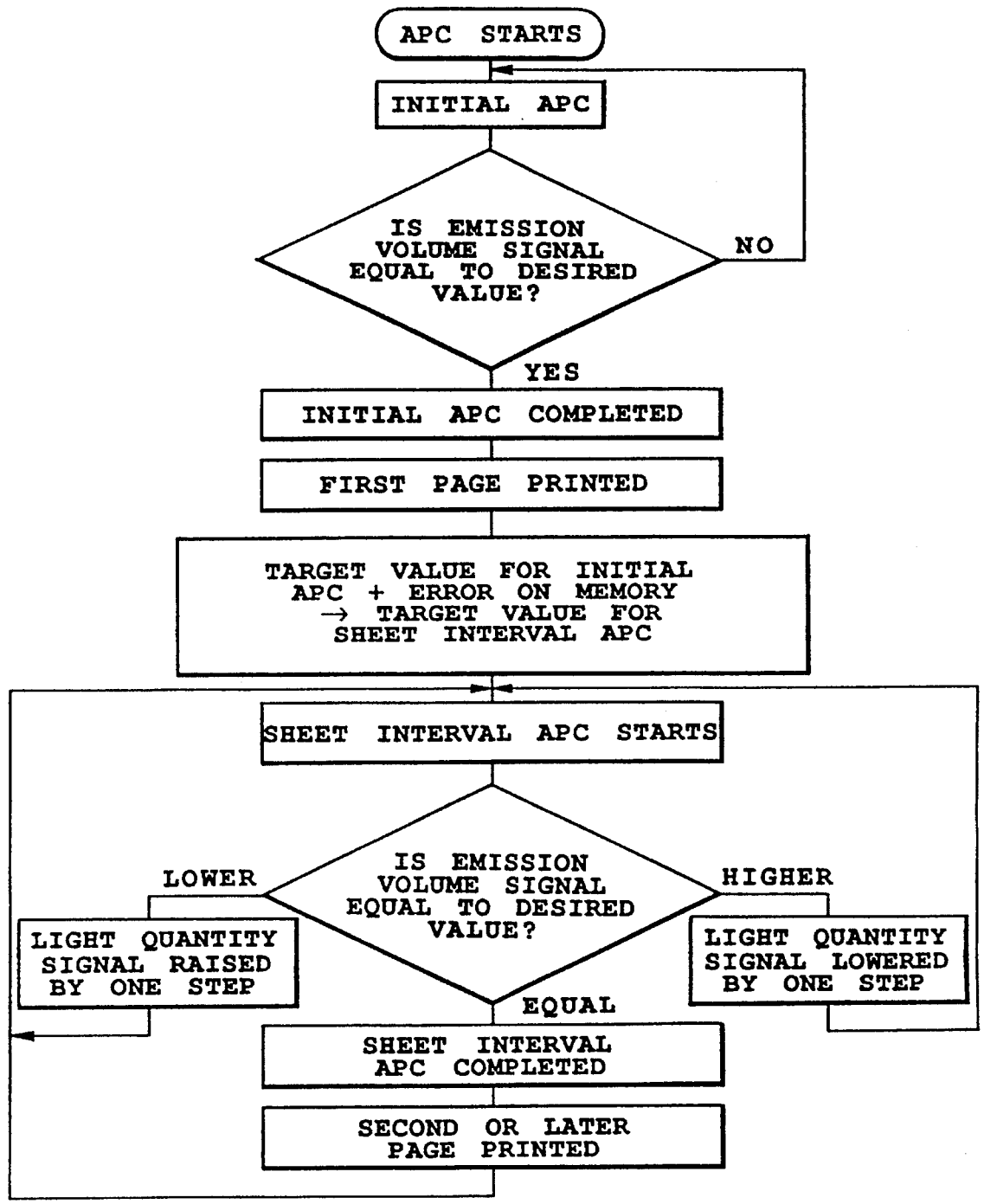
FIG. 21 is a flow chart illustrating the operation of Embodiment 8 of the present invention.

Next, the eighth embodiment of the present invention will be described. FIG. 21 illustrates the operating procedure for Embodiment 8.

Figure 22:
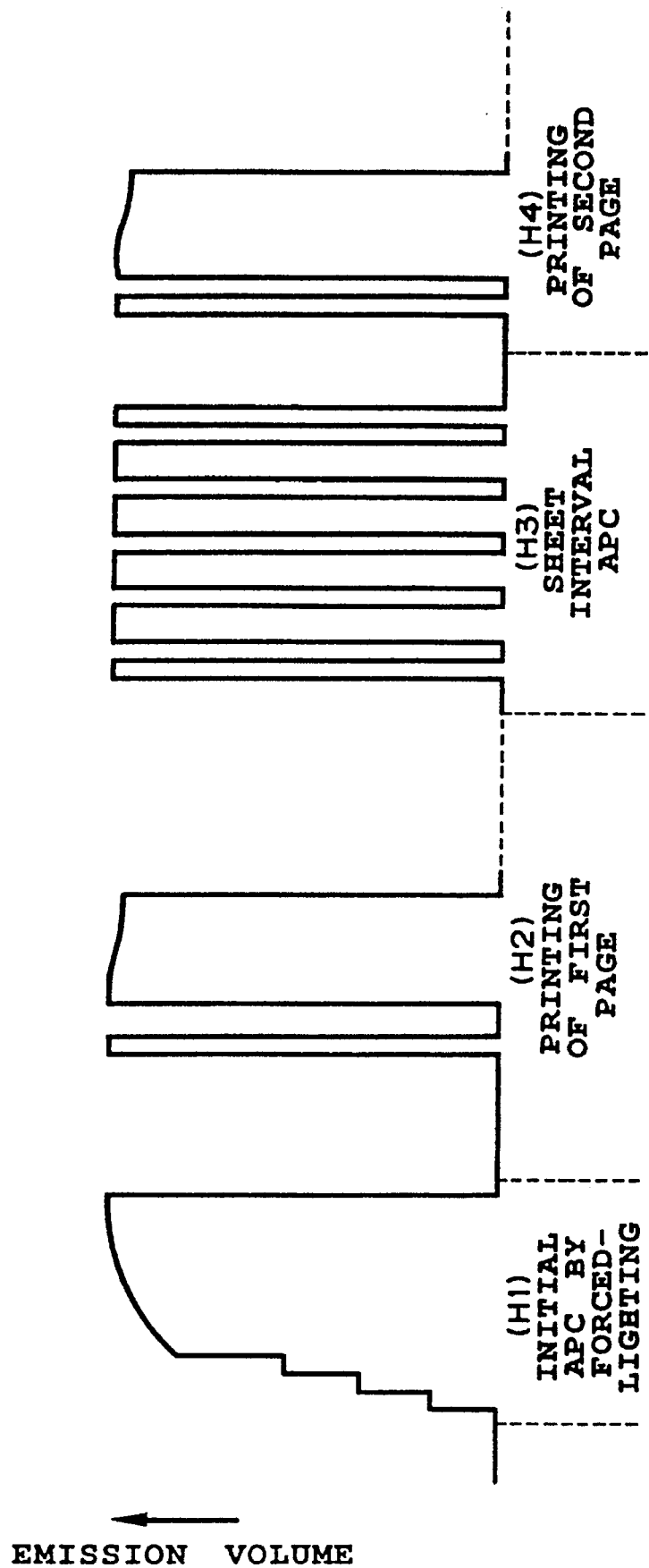
FIG. 22 is a waveform view showing the quantity of light during the operation of Embodiment 8 of the present invention.

First, the initial APC by forced-lighting is started in the same manner as in Embodiment 1. If the quantity of light emission is smaller than the desired value, the level of the light quantity signal is raised by one step. If the quantity of light emission is equal to the desired value, the initial APC operation is completed. Fluctuations in the laser light during this period correspond to H1 of a timing chart shown in FIG. 22. This initial APC operation involves light emission of the semiconductor laser for a relatively long time of several tens of microseconds, and thus is under the influence of the droop characteristic of the laser diode. Therefore, after completion of the initial APC operation, that value of the light quantity signal which is enough to correct the possible error between the quantity of light set for the initial APC and the quantity of light set for the sheet interval APC is stored in the memory. The sum of this value and the set value for the initial APC is used as a set value (target light quantity) for the sheet interval APC (H3 of FIG. 22) which is performed after completion of the printing of the first page (H2 of FIG. 22). If the quantity of light emission is smaller than this set value, the level of the light quantity signal is raised by one step; if the quantity of light emission is larger than the set value, the level of the light quantity signal is lowered by one step. If the quantity of light emission is equal to the set value, the APC operation is completed. After such operation, the printing of the second page is carried out (H4 of FIG. 22), and the same operation is performed for the third and later pages.

The above-described processing enables the accurate control of the quantity of laser light and the formation of high quality images, without increasing the number of laser lightings.

<Embodiment 9>

Figure 23:
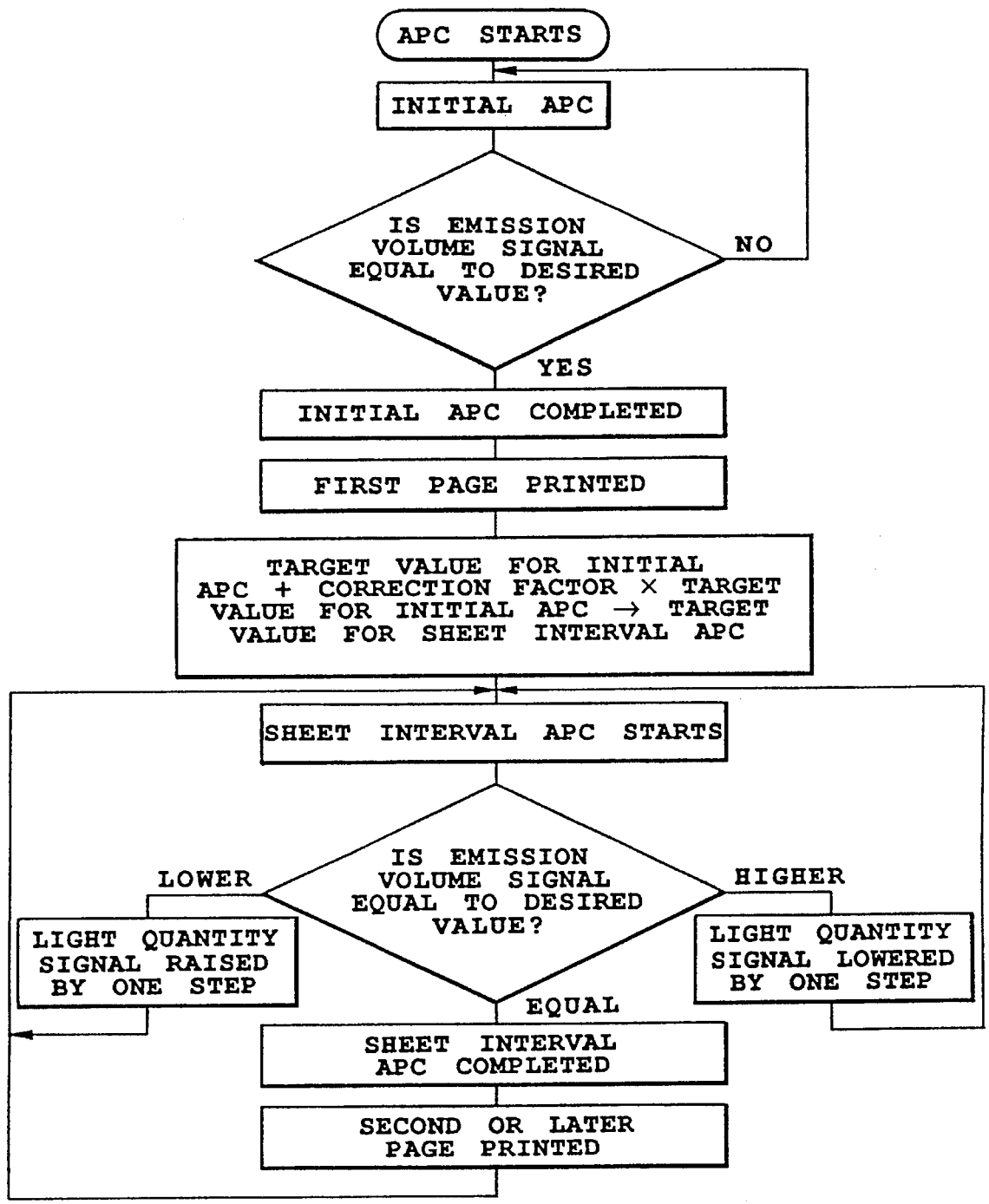
FIG. 23 is a flow chart illustrating the operation of Embodiment 9 of the present invention.

Next, Embodiment 9 of the present invention will be described. FIG. 23 illustrates the operating procedure for Embodiment 9.

Figure 24:
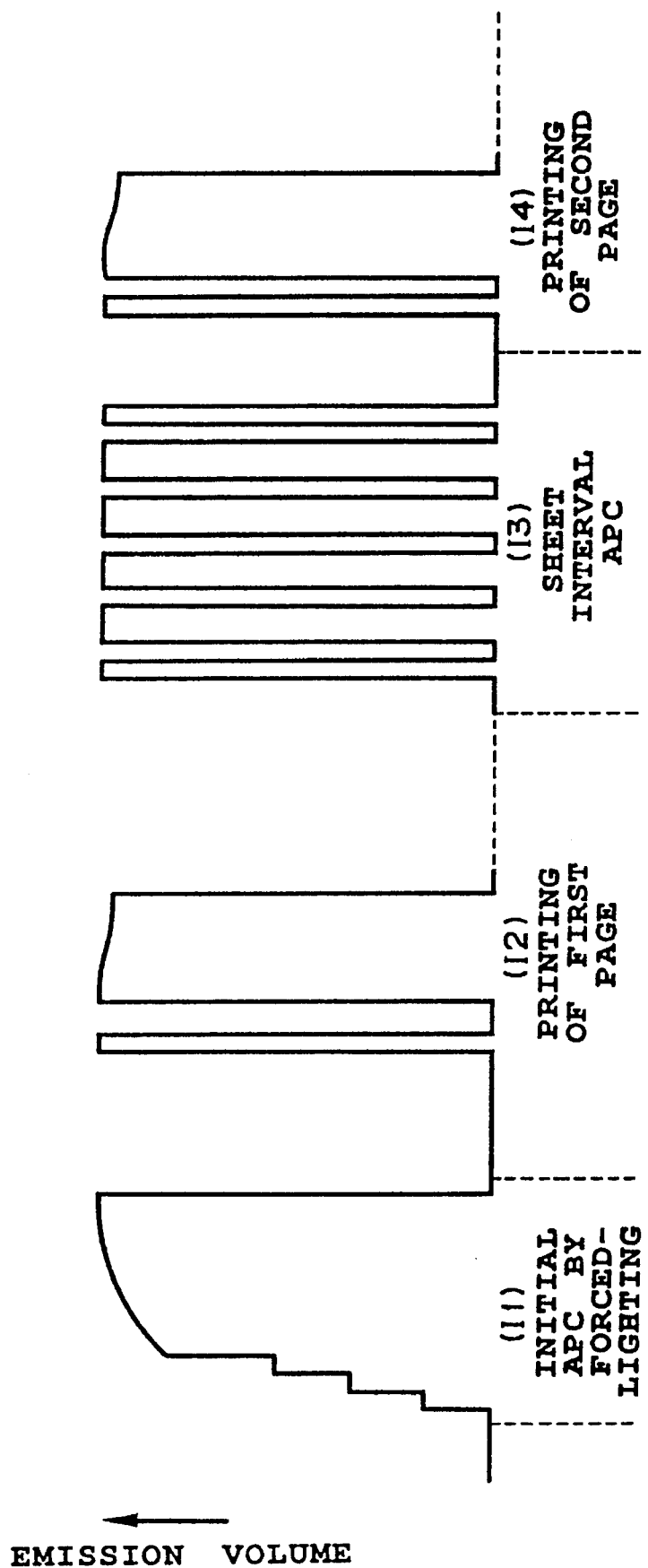
FIG. 24 is a waveform view showing the quantity of light during the operation of Embodiment 9 of the present invention.

The initial APC by forced-lighting is started in the same manner as in Embodiment 1. If the quantity of light emission is smaller than the desired value, the level of the light quantity signal is raised by one step. If the quantity of light emission is equal to the desired value, the initial APC operation is completed ($I_1$ of FIG. 24). This initial APC operation is under the influence of the droop characteristic of the laser diode as in the case of Embodiment 1. Therefore, the correction factor enough to correct the possible error between the quantity of light set for the initial APC and the quantity of light to be set for the sheet interval APC during recording of plural pages is stored in the memory. A value obtained by multiplying the set value for the initial APC by that correction factor is used as a set value for the sheet interval APC (I3 of FIG. 24) which is performed after completion of the printing of the first page (I2 of FIG. 24) but immediately before the printing of the second page (I4 of FIG. 24).

The above-described processing enables the accurate control of the quantity of laser light and the formation of high quality images, without the need to light the laser more often than required, since the value of the aforementioned correction factor is determined according to the properties of the laser.

<Embodiment 10>

Figure 25:
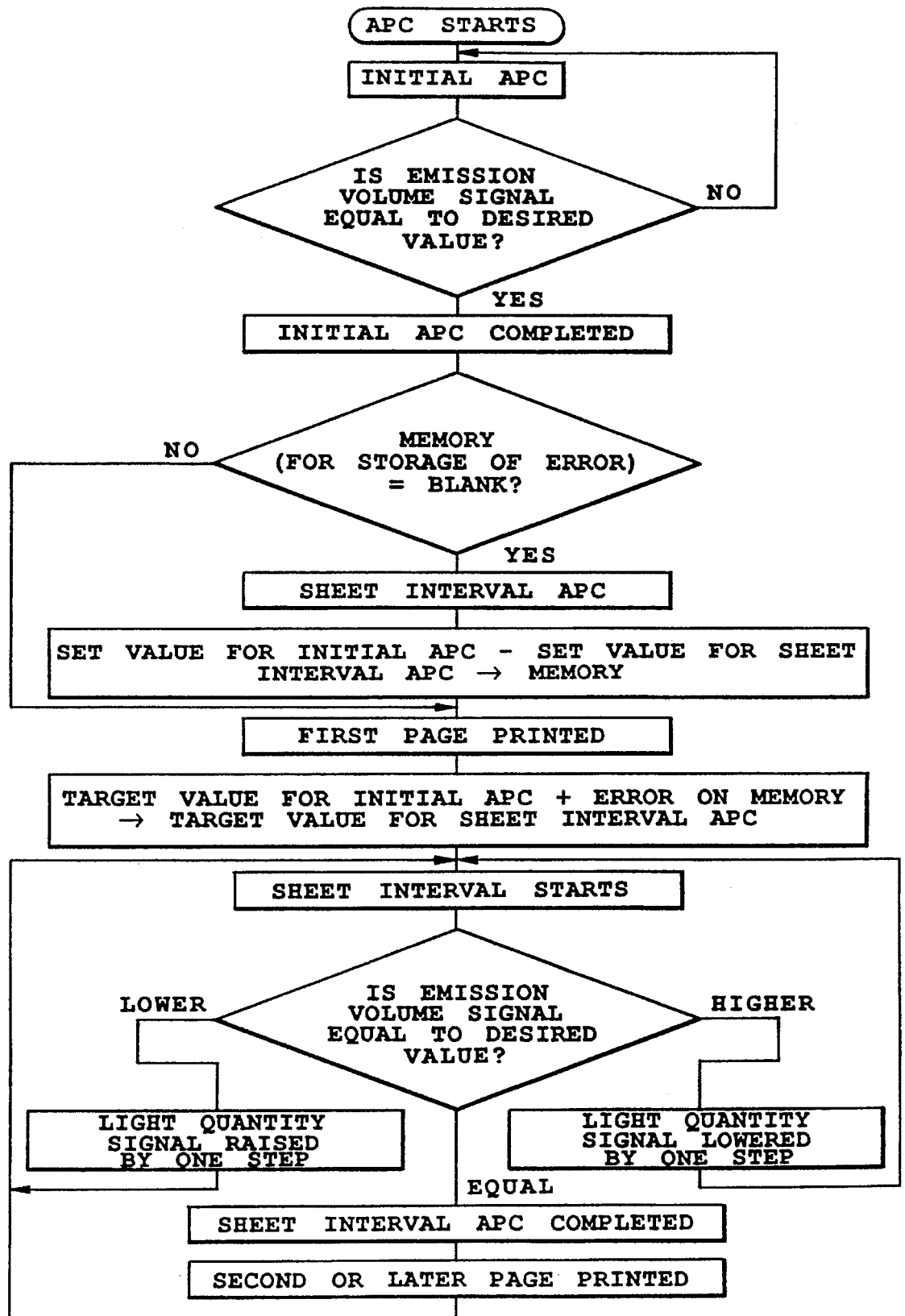
FIG. 25 is a flow chart illustrating the operation of Embodiment 10 of the present invention.
Figure 26:
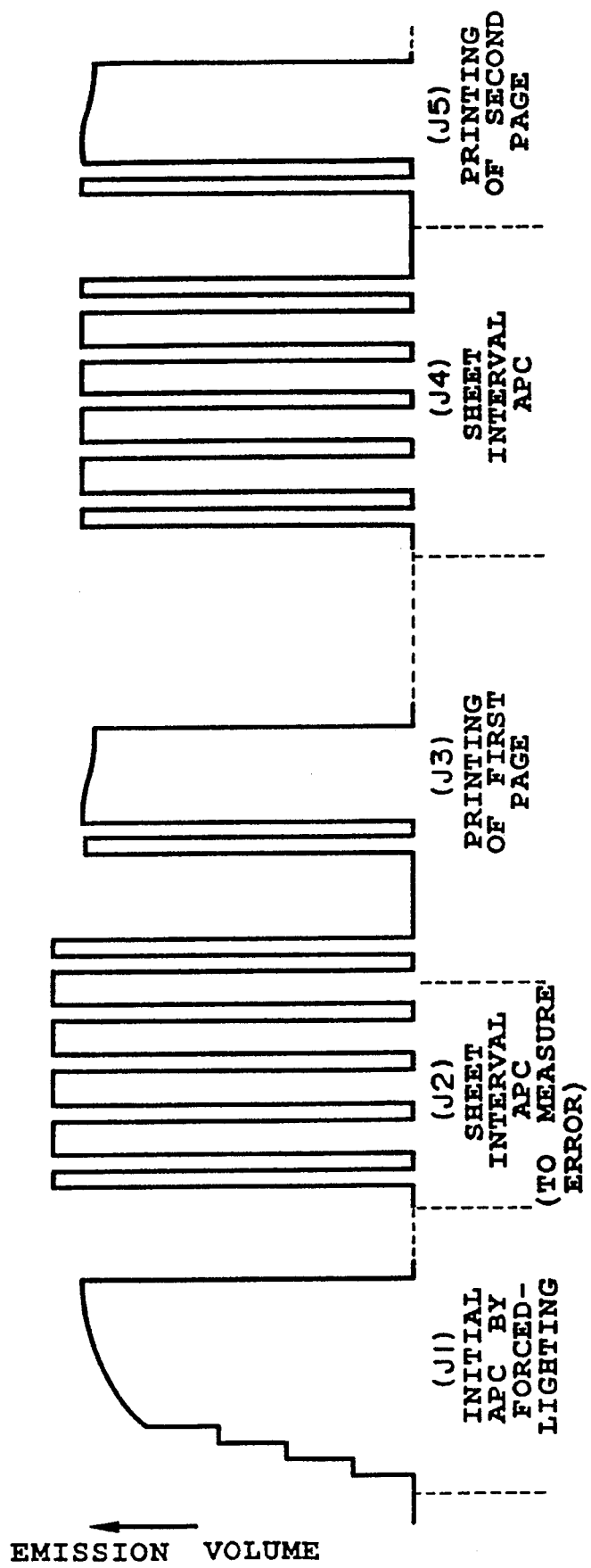
FIG. 26 is a waveform view showing the quantity of light during the operation of Embodiment 10 of the present invention.

Next, Embodiment 10 of the present invention will be described. FIG. 25 illustrates the operating procedure for Embodiment 10.

The initial APC by forced-lighting is started in the same manner as in Embodiment 1. If the quantity of light emission is smaller than the desired value, the level of the light quantity signal is raised by one step. If the quantity of light emission is equal to the desired value, the initial APC operation is completed (J1 of FIG. 25). This initial APC operation is under the influence of the droop characteristic of the laser diode as in the case of Embodiment 8.

Therefore, after the initial APC, the sheet interval APC is performed (J2 of FIG. 25) while the laser diode is in a fully cooled state. The difference between the quantity of light obtained at that time and the set value for the initial APC is detected and stored in the memory. The printing of the first sheet is performed on the basis of the set value of the initial APC. The error stored in the memory, on the other hand, is retained until the power source is OFF or the door is OPEN. If the continuous printing of two or more sheets is conducted during this period, a value obtained by adding the error stored in the memory to the target quantity of light for the first sheet is used as a set value for the quantity of light for the second and later sheets.

The above-described procedure permits the accurate adjustment of the quantity of light that is more suitable for the properties of the laser.

<Embodiment 11>

Figure 27:
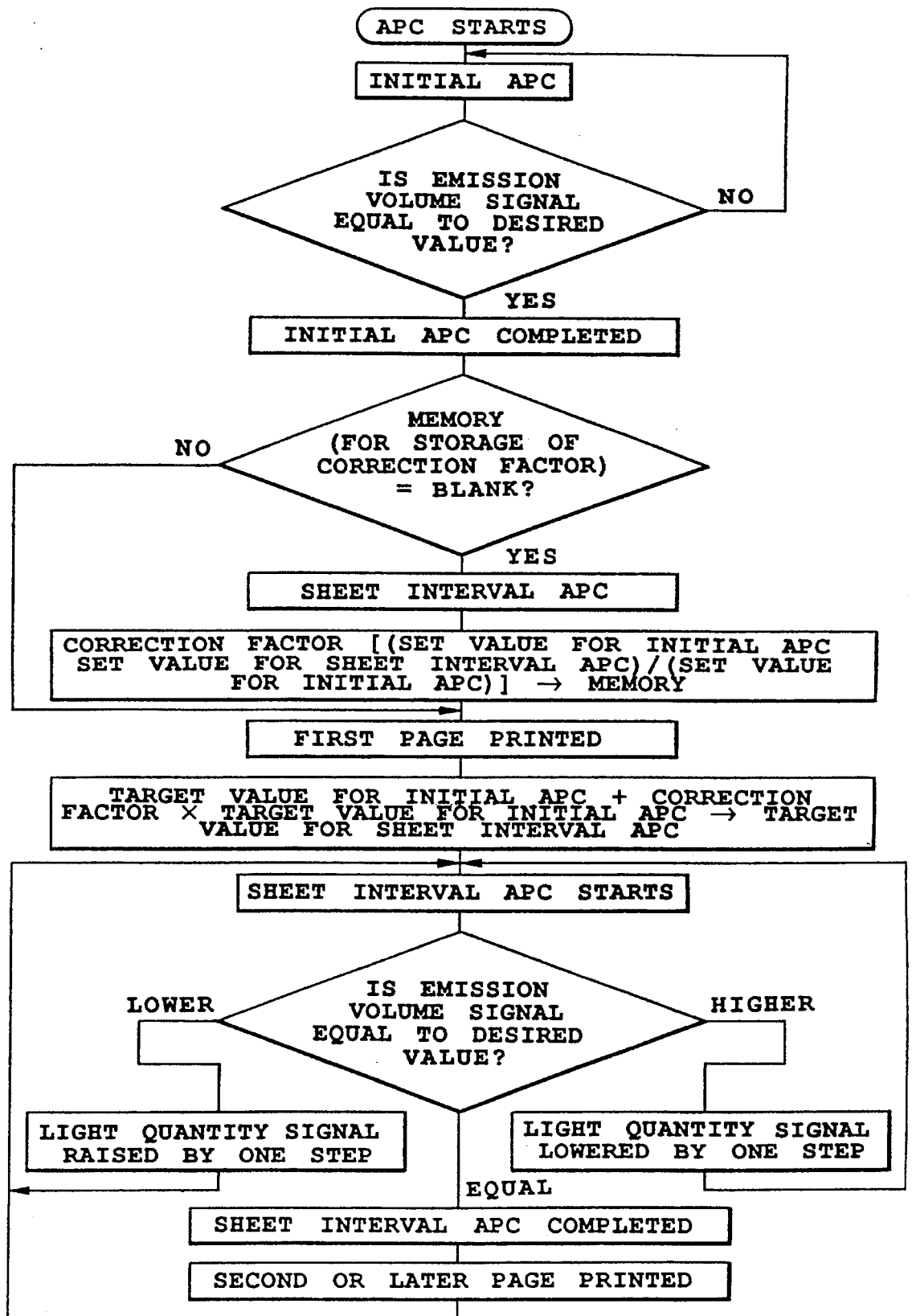
FIG. 27 is a flow chart illustrating the operation of Embodiment 11 of the present invention.

Next, Embodiment 11 of the present invention will be described. FIG. 27 illustrates the operating procedure for Embodiment 11.

The initial APC by forced-lighting is started in the same manner as in Embodiment 1. If the quantity of light emission is smaller than the desired value, the level of the light quantity signal is raised by one step. If the quantity of light emission is equal to the desired value, the initial APC operation is completed (K1 of FIG. 28). This initial APC operation is under the influence of the droop characteristic of the laser diode as in the case of Embodiment 1.

Therefore, immediately after the initial APC, the sheet interval APC is performed (K2 of FIG. 28) while the temperature of the laser is sufficiently low. The rate of the set value for the sheet interval APC to the set value for the initial APC is calculated. A value to multiply the set value for the initial APC in order to make a correction corresponding to that rate is obtained, and stored in the memory. This value is retained until the power source is OFF or the door is OPEN.

Figure 28:
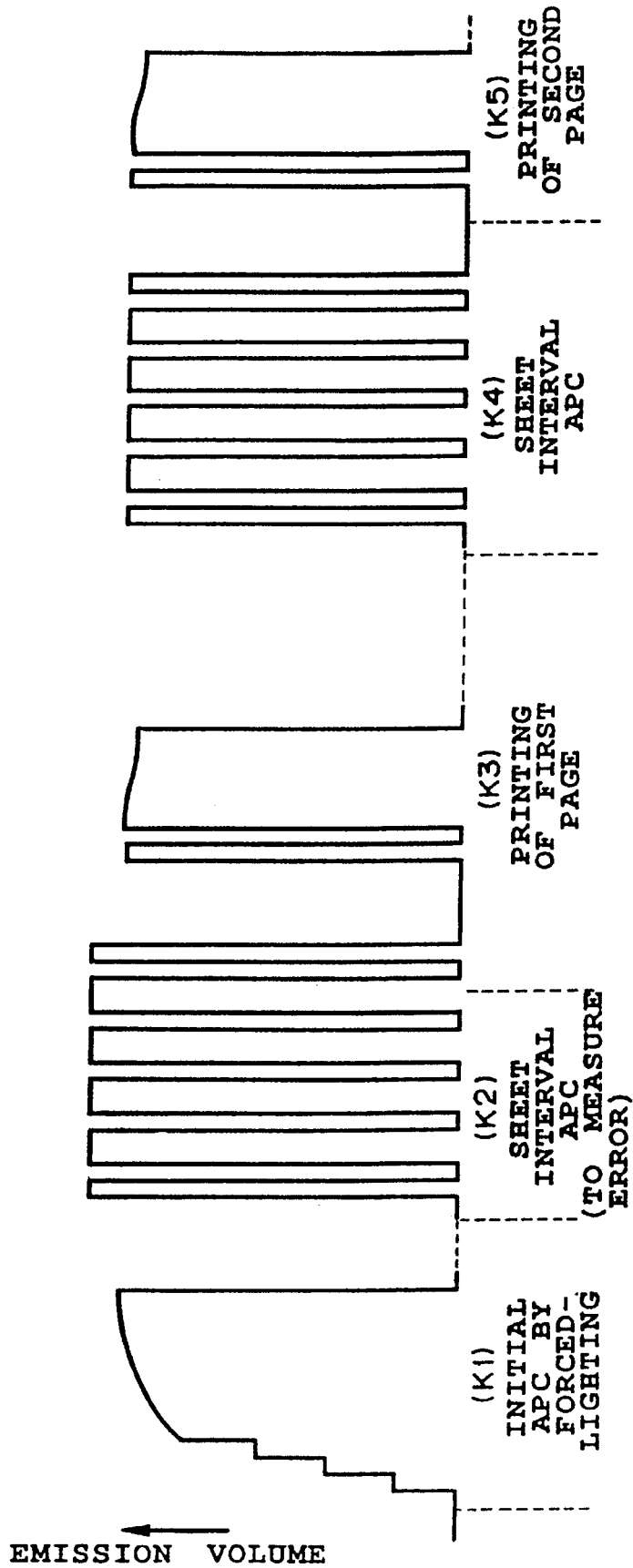
FIG. 28 is a waveform view showing the quantity of light during the operation of Embodiment 11 of the present invention.

For the continuous printing of two or more sheets, the set value for the initial APC multiplied by the above-mentioned rate stored in the memory is added to the set value for the initial APC, and the resulting product is used as a set value for the sheet interval APC indicated in K4 of FIG. 28 and subsequent operation.

<Embodiment 12>

Figure 29:
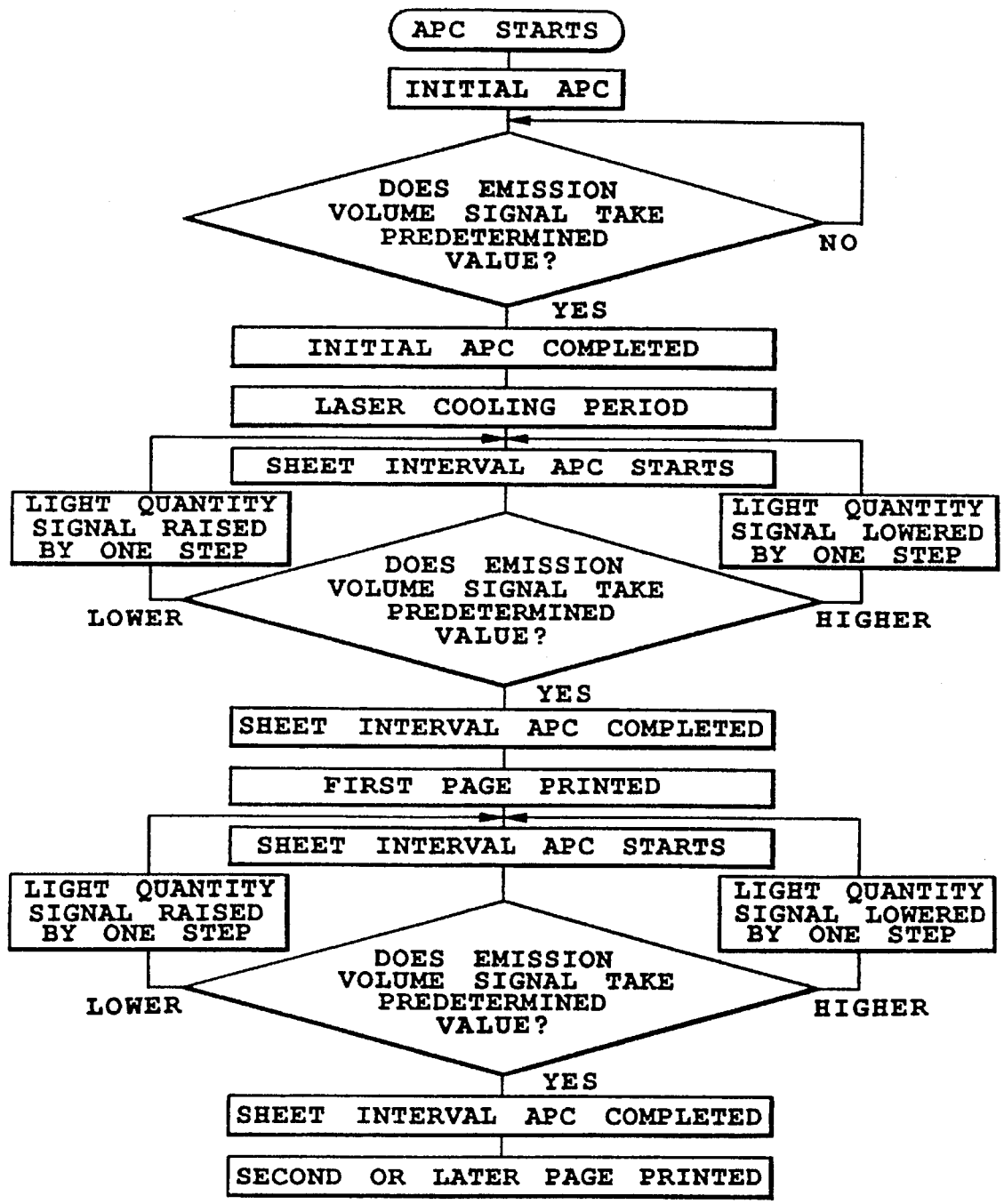
FIG. 29 is a flow chart illustrating Embodiment 12 of the present invention.

Next, Embodiment 12 of the present invention will be described. FIG. 29 illustrates the operating procedure for this embodiment.

First, the initial APC by forced-lighting is started, and a judgment of whether the quantity of light emission takes a predetermined value or not is made. If the quantity of light emission is smaller than the predetermined value, the level of the light quantity signal is raised by one step. At a time when the quantity of light emission coincides with the predetermined value, the APC operation is completed. This initial IAPC operation takes a long time of several tens of microseconds until being complete. Thus, the droop characteristic of the laser diode affects the setting of the quantity of light.

Hence, after completion of the initial APC operation, the laser diode is cooled for a predetermined time, and the sheet interval APC is started. In this case, laser light is emitted based on the results of the initial APC, and whether the emission volume signal takes a predetermined value or not is judged. If it is higher than the predetermined value, the level of the light quantity signal is lowered by one step. If the emission volume signal is lower than the predetermined value, by contrast, the level of the light quantity signal is raised by one step, thereby adjusting the quantity of light emission. At a time when the emission volume signal becomes equal to the predetermined value, the sheet interval APC is completed, and the first page is printed. After completion of the printing of the first page, the sheet interval APC is carried out as usual, and the second page is printed. The same operation is performed for the third and later pages.

Figure 30:
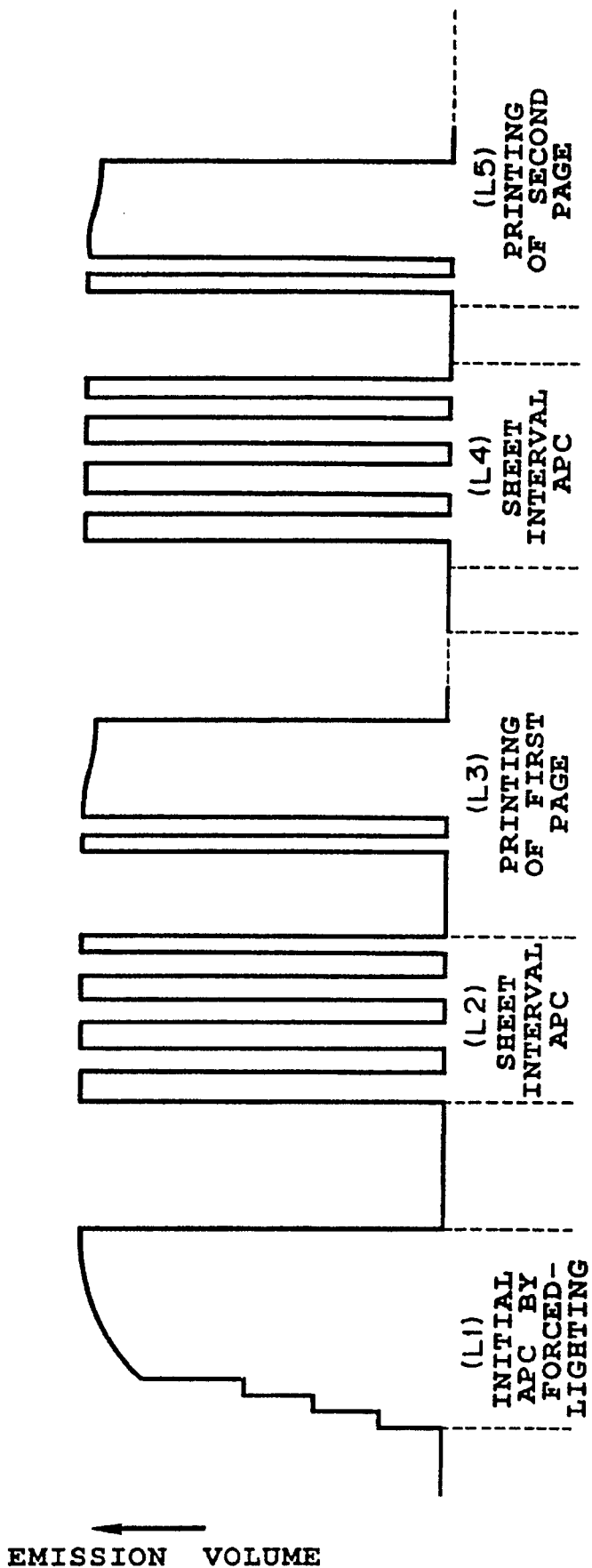
FIG. 30 is a schematic view showing the timing of light emission by the laser diode in Embodiment 12 of the present invention.

The actions of the laser light in the above-described printing sequence are shown in FIG. 30.

In this drawing, L1 denotes a waveform of each laser light in an area for the initial APC by forced-lighting; L2, that in an area for the sheet interval APC that follows; L3, that in an area for printing of the first page; L4, that in an area for the sheet interval APC at a space between the first page and the second page; and L5, that in an area of printing of the second page.

Here, the set values of the quantities of light emissions in the areas L2 and L4 are nearly equal to each other. Hence, the densities of prints on the first page and the second and later pages are comparable, making it possible to form high quality images.

<Embodiment 13>

Figure 31:
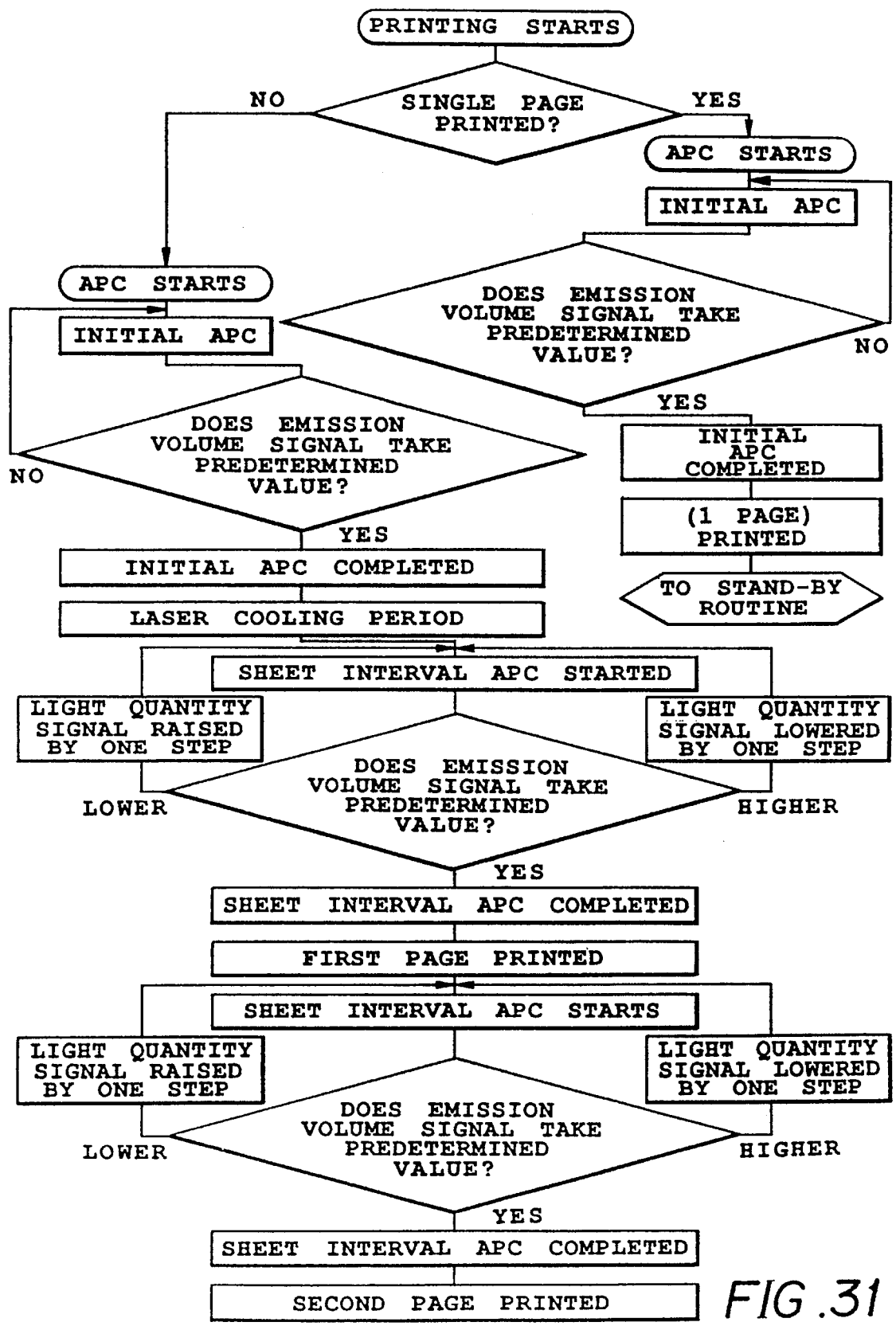
FIG. 31 is a flow chart illustrating Embodiment 13 of the present invention.

FIG. 31 illustrates the operating procedure for Embodiment 13 of light quantity control relevant to the present invention.

In case the designated number of prints can be sensed by a printer controller (not shown) or an external host computer (not shown), whether a single page (1 page) is to be printed or not is judged after start of printing. If a single page is to be printed, conventional light quantity control is performed. Concretely, the initial APC by forced-lighting is started, and a judgment of whether the emission volume signal takes a predetermined value or not is made. If it is lower than the predetermined value, the level of the light quantity signal is raised by one step. At a time when the quantity of light emission coincides with the predetermined value, the APC operation is completed. Then, printing is done, and the operation is shifted to printing stand-by routine control.

In case printing of plural pages is instructed, the same light quantity control as in Embodiment 12 is performed. Namely, the initial APC by forced-lighting is started, and a judgment of whether the emission volume signal takes a predetermined value or not is made. If it is lower than the predetermined value, the level of the light quantity signal is raised by one step. At a time when the quantity of light emission coincides with the predetermined value, the APC operation is completed. In the case of printing plural pages, the droop characteristic of the laser diode affects the setting of the quantity of light in this initial APC operation. Thus, after the completion of the initial APC operation, the laser diode is cooled for a predetermined period of time, and then the sheet interval APC is started.

In the sheet interval APC, laser light is emitted based on the results of the initial APC, and whether the emission volume signal takes a predetermined value or not is judged. If it is higher than the predetermined value, the level of the light quantity signal is lowered by one step. If the emission volume signal is lower than the predetermined value, by contrast, the level of the light quantity signal is raised by one step, thereby adjusting the quantity of light emission. At a time when the emission volume signal becomes equal to the predetermined value, the sheet interval APC is completed, and the first page is printed. After completion of the printing of the first page, the sheet interval APC is carried out, and the second page is printed. The same operation is performed for the third and later pages.

The above-described procedure can increase the printing speed in the printing of a single page. In the printing of two or more pages, this procedure enables appropriate light quantity control without differences in the printing densities on respective recording sheets, thus making it possible to form high quality images.

<Embodiment 14>

Figure 32:
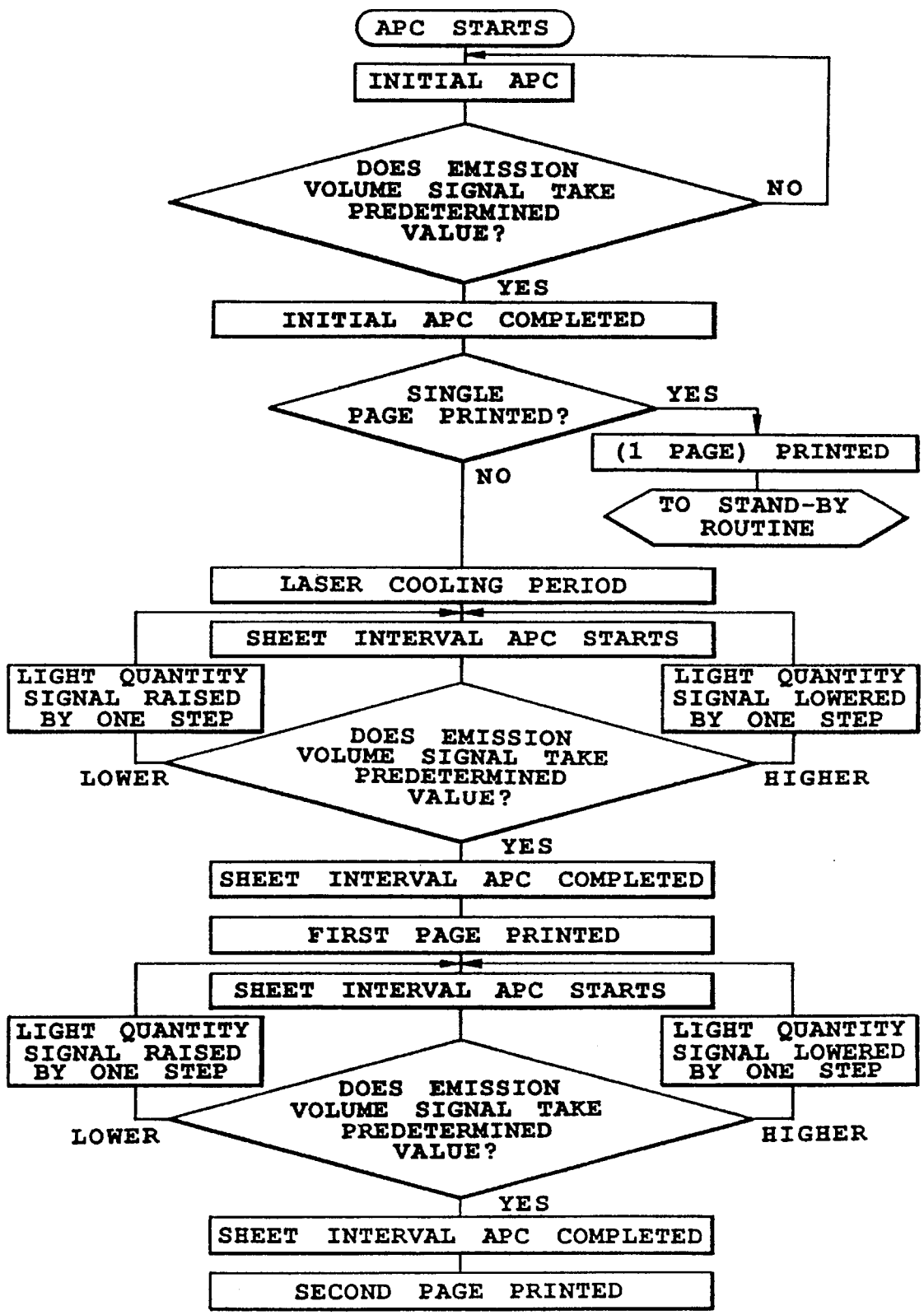
FIG. 32 is a flow chart illustrating Embodiment 14 of the present invention.

FIG. 32 illustrates the operating procedure for Embodiment 14 of light quantity control relevant to the present invention.

In case the designated number of prints can be sensed by a printer controller (not shown) or an external host computer (not shown), as in Embodiment 13, the initial APC by forced-lighting is started upon receipt of the instruction to do printing. A judgment of whether the emission volume signal takes a predetermined value or not is made. If it is lower than the predetermined value, the level of the light quantity signal is raised by one step. At a time when the quantity of light emission coincides with the predetermined value, the APC operation is completed. On this occasion, whether printing of a single page is to be done or not is judged. In the case of a single-page printing, printing is done, and the operation is shifted to printing stand-by routine control.

In case printing of plural pages is instructed, the laser diode is cooled for a predetermined period of time in view of the droop characteristic of the laser diode, and the sheet interval APC is started. First, laser light is emitted based on the results of the initial APC, and whether the emission volume signal takes a predetermined value or not is judged. If it is higher than the predetermined value, the level of the light quantity signal is lowered by one step. If the emission volume signal is lower than the predetermined value, by contrast, the level of the light quantity signal is raised by one step, thereby adjusting the quantity of light emission. At a time when the emission volume signal becomes equal to the predetermined value, the sheet interval APC is completed, and the first page is printed. After completion of the printing of the first page, the sheet interval APC is carried out, and the second page is printed. The same operation is performed for the third and later pages.

As described above, the present invention performs sequential APC in the light of the droop characteristic of the laser diode. Hence, even when continuous recording of two or more sheets is performed, no differences in printing density emerge between the first page and the second and later pages, thus making it possible to obtain a uniform image density in all recording sheets.

The present invention has been described in detail with respect to preferred embodiments, and it will now be obvious that changes and modifications may be made without departing from the invention in its broader aspects, and it is our intention, therefore, in the appended claims to cover all such changes and modifications as fall within the true spirit of the invention.

What is claimed is:

1. An apparatus for controlling a light source, which emits light modulated by modulation information, comprising:

detecting means for detecting a light quantity of the light source;

controlling means for controlling emission of the light source independently of the modulation information; and current controlling means for controlling a current applied to the light source when the light source is controlled to emit by said controlling means so that the light quantity detected by said detecting means becomes a predetermined value, wherein said controlling means controls the light source to emit continuously prior to an image formation, then to emit intermittently at least during a non-imaging period prior to the image formation and during an interval between pages, and wherein during a subsequent image formation the current applied to the light source is retained at a value such that the light quantity detected prior to the image formation or during the non-imaging period reaches to the predetermined value.

2. An apparatus for controlling a light source according to claim 1, further comprising stopping means for stopping emission of the light source during certain period in order to cool down a temperature of the light source after the continuous emission of the light source.

3. An apparatus for controlling a light source according to claim 1, further comprising deflecting means for deflecting the light emitted from the light source.

4. An apparatus for controlling a light source according to claim 3, further comprising means for detecting the deflected light at a given point, wherein when the light source is emitted intermittently said light source is caused to emit light in accordance with timing of detecting the deflected light at the given point.

5. An apparatus for controlling a light source according to claim 4, further comprising means for forming an image using the light modulated on the basis of the information by electrophotographic recording.

6. An apparatus for controlling a light source according to claim 4, wherein said current controlling means comprises a comparison means for comparing the predetermined value and the light quantity detected by said detecting means, and a counting means being increased or decreased on the basis of the results of comparison obtained by the comparison means.

7. An apparatus for controlling a light source according to claim 6, wherein said counting means starts to count from a given initial value when the light source emits continuously.

8. An apparatus for controlling a light source according to claim 6, wherein said current controlling means comprises a means for converting the light quantity detected by said detecting means to a digital value and a means for converting the counted value of said counting means to an analog signal.

* * * * *